US011673096B2

(12) United States Patent
Muse et al.

(10) Patent No.: US 11,673,096 B2
(45) Date of Patent: Jun. 13, 2023

(54) SUB-BLOCK SEALING FOR ELECTROCHEMICAL SEPARATION DEVICES

(71) Applicant: Evoqua Water Technologies LLC, Pittsburgh, PA (US)

(72) Inventors: Michael J. Muse, Somerville, MA (US); Joshua Griffis, Ashburnham, MA (US); LI-Shiang Liang, Harvard, MA (US); Michael Shaw, Derry, NH (US); Simon P. Dukes, Chelmsford, MA (US)

( * ) Notice: Subject to any disclaimer, the term of this patent is extended or adjusted under 35 U.S.C. 154(b) by 478 days.

(21) Appl. No.: 16/630,226

(22) PCT Filed: Jul. 11, 2018

(86) PCT No.: PCT/US2018/041553
§ 371 (c)(1),
(2) Date: Jan. 10, 2020

(87) PCT Pub. No.: WO2019/014297
PCT Pub. Date: Jan. 17, 2019

(65) Prior Publication Data
US 2020/0129926 A1    Apr. 30, 2020

Related U.S. Application Data

(60) Provisional application No. 62/531,030, filed on Jul. 11, 2017.

(51) Int. Cl.
*B01D 61/48*    (2006.01)
*B01D 65/00*    (2006.01)
(Continued)

(52) U.S. Cl.
CPC ........... *B01D 65/003* (2013.01); *B01D 61/50* (2013.01); *B01D 63/085* (2013.01);
(Continued)

(58) Field of Classification Search
CPC .... B01D 65/003; B01D 61/50; B01D 63/085; B01D 2313/04; C02F 2201/004; C02F 1/4693; C02F 1/4695
See application file for complete search history.

(56) References Cited

U.S. PATENT DOCUMENTS 6,235,166 B1    5/2001    Towe et al.
7,147,785 B2    12/2006    Arba et al.
(Continued)

FOREIGN PATENT DOCUMENTS

EP    2663388 A1    11/2013
EP    2695665 A1    2/2014

OTHER PUBLICATIONS

"European communication pursuant to to Article 94(3) EPC" issued by the European Patent Office regarding related to European application No. 18832674.8, dated Jun. 9, 2022, 7 pages.

*Primary Examiner* — Zulmariam Mendez

(57) ABSTRACT

An electrochemical separation device includes a first electrode, a second electrode, and a cell stack including a plurality of sub-blocks each having alternating depleting compartments and concentrating compartments and each including frame and channel portions disposed between the first electrode and the second electrode. An internal seal formed of a first material is disposed between and in contact with the channel portions between adjacent sub-blocks in the cell stack and configured to prevent leakage between depleting compartments and concentrating compartments in the adjacent sub-blocks. An external seal formed of a second material having at least one material parameter different from the first material is disposed between and in contact with the frames of the adjacent sub-blocks in the cell stack and configured to prevent leakage from an internal volume of the electrochemical separation device to outside of the electrochemical separation device.

20 Claims, 40 Drawing Sheets

(51) Int. Cl.
*B01D 61/50* (2006.01)
*B01D 63/08* (2006.01)
*C02F 1/469* (2023.01)

(52) U.S. Cl.
CPC .......... *C02F 1/4693* (2013.01); *C02F 1/4695* (2013.01); *B01D 2313/04* (2013.01); *C02F 2201/004* (2013.01)

(56) References Cited

U.S. PATENT DOCUMENTS

| | | | |
|---|---|---|---|
| 2005/0016932 A1* | 1/2005 | Arba | B01D 61/50 210/243 |
| 2006/0125187 A1 | 6/2006 | Bartlett et al. | |
| 2008/0237045 A1 | 10/2008 | Montminy et al. | |
| 2012/0118729 A1* | 5/2012 | Liang | B01D 61/48 204/267 |
| 2012/0118744 A1 | 5/2012 | Liang et al. | |
| 2012/0199484 A1 | 8/2012 | Liang | |
| 2016/0310902 A1 | 10/2016 | Sawant et al. | |

* cited by examiner

SUB-BLOCK SEALING FOR ELECTROCHEMICAL SEPARATION DEVICES

RELATED APPLICATIONS

This application claims priority under 35 U.S.C. § 119(e) to U.S. Provisional Application Ser. No. 62/531,030, titled "SUBBLOCK SEALING IMPROVEMENTS FOR CROSS FLOW ED MODULES", filed on Jul. 11, 2017, which is incorporated herein by reference in its entirety.

BACKGROUND

1. Field of Disclosure

Aspects and embodiments disclosed herein are directed generally to electrochemical membrane systems and method of fabricating same.

2. Discussion of Related Art

Devices for purifying fluids using electrical fields may be used to treat water and other liquids containing dissolved ionic species. Two types of devices that treat water in this way are electrodeionization and electrodialysis devices. Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Devices similar in construction to electrodialysis devices can be used as reverse electrodialysis (RED) devices. The two sets of compartments are fed with fluids of different ionic concentrations, separated by the ion-selective membranes; for example, seawater and river water. The difference in concentrations and chemical potentials result in a voltage difference across each membrane, which when summed up over the total number of membranes in a device result in a voltage potential generated at the two electrodes that bound the stack of compartments and membranes.

SUMMARY

In accordance with one or more aspects, an electrochemical separation system may comprise a first electrode, a second electrode, a first electrochemical separation modular unit having a first cell stack defining a plurality of alternating depleting compartments and concentrating compartments supported by a first frame, the first electrochemical separation modular unit positioned between the first electrode and the second electrode, and a second electrochemical separation modular unit, adjacent to and in cooperation with the first electrochemical separation modular unit, having a second cell stack defining a plurality of alternating depleting compartments and concentrating compartments supported by a second frame, the second electrochemical separation modular unit positioned between the first electrochemical separation modular unit and the second electrode.

In accordance with one or more aspects, a method of assembling an electrochemical separation system may comprise mounting a first electrochemical separation modular unit having a first cell stack surrounded by a first frame in a vessel between a first electrode and a second electrode, and mounting a second electrochemical separation modular unit having a second cell stack surrounded by a second frame in the vessel between the first electrochemical separation modular unit and the second electrode.

In accordance with one or more aspects, an electrochemical separation modular unit may comprise a cell stack defining a plurality of alternating depleting compartments and concentrating compartments, and a frame surrounding the cell stack and including a manifold system configured to facilitate fluid flow through the cell stack.

In accordance with one or more aspects, a flow distributor for electrochemical separation may comprise a plurality of first passages oriented in a first direction and configured to deliver feed to at least one compartment of an electrochemical separation device, and a plurality of second passages oriented in a second direction, the plurality of second passages in fluid communication with the plurality of first passages and with an inlet manifold associated with the electrochemical separation device.

In accordance with one or more aspects, an electrochemical separation system may comprise a first electrode, a second electrode, a first electrochemical separation modular unit including a plurality of alternating depleting compartments and concentrating compartments positioned between the first and second electrodes, a second electrochemical separation modular unit including a plurality of alternating depleting compartments and concentrating compartments, the second electrochemical separation modular unit arranged in cooperation with the first electrochemical separation modular unit and positioned between the first electrochemical separation modular unit and the second electrode, and a spacer disposed between and adjacent the first and second electrochemical separation modular units configured to reduce current loss within the system.

In accordance with one or more embodiments, a modular electrochemical separation system, which may also be referred to as an electrical purification device or apparatus, may enhance the efficiency and overall flexibility of various treatment processes. In some embodiments, cross-flow electrochemical separation devices, such as cross-flow electrodialysis (ED) devices, may be implemented as an attractive alternative to traditional plate-and-frame devices. Cross flow devices are described in U.S. Pat. No. 8,627,560 B2, U.S. Pat. No. 8,741,121 B2 and U.S. Pat. No. 9,782,725 all of which are incorporated herein by reference in their entirety for all purposes.

One or more embodiments disclosed herein relate to devices that may purify fluids electrically that may be contained within a housing, as well as methods of manufacture and use thereof. Liquids or other fluids to be purified enter the purification device and, under the influence of an electric field, are treated to produce an ion-depleted liquid. Species from the entering liquids are collected to produce an ion-concentrated liquid.

In accordance with one or more embodiments, an electrochemical separation system or device may be modular. Each modular unit may generally function as a sub-block of an overall electrochemical separation system. A modular unit may include any desired number of cell pairs. In some embodiments, the number of cell pairs per modular unit may depend on the total number of cell pairs and passes in the separation device. It may also depend on the number of cell pairs that can be thermally bonded and potted in a frame with an acceptable failure rate when tested for cross-leaks and other performance criteria. The number can be based on statistical analysis of the manufacturing process and can be increased as process controls improve. In some non-limiting embodiments, a modular unit may include from about 50 to about 100 cell pairs. Modular units may be individually assembled and quality control tested, such as for leakage, separation performance and pressure drop prior to being incorporated into a larger system. In some embodiments, a cell stack may be mounted in a frame as a modular unit that can be tested independently. A plurality of modular units can then be assembled together to provide an overall intended number of cell pairs in an electrochemical separation device. In some embodiments, an assembly method may generally involve placing a first modular unit on a second modular unit, placing a third modular unit on the first and second modular units, and repeating to obtain a plurality of modular units of a desired number. In some embodiments, the assembly or individual modular units may be inserted into a pressure vessel for operation. Multi-pass flow configurations may be possible with the placement of blocking membranes and/or spacers between modular units or within modular units. A modular approach may improve manufacturability in terms of time and cost savings. Modularity may also facilitate system maintenance by allowing for the diagnosis, isolation, removal and replacement of individual modular units. Individual modular units may include manifolding and flow distribution systems to facilitate an electrochemical separation process. Individual modular units may be in fluid communication with one another, as well as with central manifolding and other systems associated with an overall electrochemical separation process.

In accordance with one or more aspects, an electrochemical separation apparatus may comprise a cell stack. The cell stack may further comprise a plurality of aligned cell pairs, each of the plurality of aligned cell pairs including an ion concentrating compartment constructed and arranged to provide fluid flow in a first direction and an ion diluting compartment constructed and arranged to provide fluid flow in a second direction that is different from the first direction In accordance with one or more aspects, there is provided an electrochemical separation device. The electrochemical separation device comprises a first electrode, a second electrode, and a cell stack including a plurality of sub-blocks each having alternating depleting compartments and concentrating compartments disposed between the first electrode and the second electrode, each of the sub-blocks including a frame and channel portions. An internal seal formed of a first material is disposed between and in contact with the channel portions between adjacent sub-blocks in the cell stack and configured to prevent leakage between depleting compartments and concentrating compartments in the adjacent sub-blocks. An external seal formed of a second material having at least one material parameter different from the first material is disposed between and in contact with the frames of the adjacent sub-blocks in the cell stack and configured to prevent leakage from an internal volume of the electrochemical separation device to outside of the electrochemical separation device.

In some embodiments, the external seal is configured to withstand a higher pressure across the external seal without leaking than the internal seal.

In some embodiments, the internal seal is configured to prevent leakage between the depleting compartments and concentrating compartments under conditions in which the channel portions exhibit sinks of less than about 1 mm in depth.

In some embodiments, the external seal is configured to prevent leakage from the internal volume of the electrochemical separation device under conditions in which the frames exhibit pits of less than about 250 $\mu$m in depth.

In some embodiments, the internal seal includes closed-cell silicone foam.

In some embodiments, the internal seal includes a plurality of separate sections of the closed-cell silicone foam.

In some embodiments, the device further comprises internal volume displacement sections disposed between adjacent sections of the internal seal.

In some embodiments, the internal volume displacement sections are formed of a same material or a softer material than the sections of the internal seal.

In some embodiments, the external seal is formed of a sheet of silicone rubber.

In some embodiments, apertures are defined in the external seal over closed portions of the frames.

In some embodiments, the device further comprises an end-block housing an electrode, a sub-block adjacent the end-block including a spacer bonded to a face thereof over the frame and channel portions, an O-ring groove defined between the spacer and the end-block, and an O-ring disposed within the O-ring groove.

In some embodiments, the device further comprises an end-block housing an electrode, having a plurality of O-ring grooves defined between the end-block and a sub-block adjacent the end-block, and an O-ring disposed in each O-ring groove.

In accordance with another aspect, there is provided a method of applying a seal to an end-block of an electrochemical separation device. The method comprises disposing sections of an internal seal in a jig having cutouts configured to retain the sections of the internal seal, the sections of the internal seal formed of a first material, placing a sub-block of the electrochemical separation device including a channel portion and a frame on the jig, adhering the sections of the internal seal to the channel portion on a side of the sub-block, removing the sub-block from the jig, and applying an external seal to the frame on the side of the sub-block, the external seal formed of a second material including at least one material parameter different from the first material.

In some embodiments, the method further comprises forming the sections of the internal seal from the first material.

In some embodiments, the method further comprises forming the external seal from the second material, the second material being harder than the first material.

In some embodiments, the method further comprises comprising forming apertures in the external seal in locations in the external seal that are to be disposed over bare areas of the frame.

In some embodiments, forming the sections of the internal seal from the first material comprises forming the sections of the internal seal from silicone foam.

In some embodiments, forming the external seal from the second material comprises forming the external seal from a sheet of silicone rubber.

In some embodiments, the method further comprises disposing sections of volume displacement material within the jig between adjacent sections of the internal seal.

In some embodiments, the method further comprises adhering the sections of volume displacement material to the channel portion on the side of the sub-block.

In some embodiments, the device is an electrodialysis device for purifying fluids using electrical fields In some embodiments, the device is a reverse electrodialysis device for generation of electrical power from two or more fluid streams with different ionic concentrations Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1B:
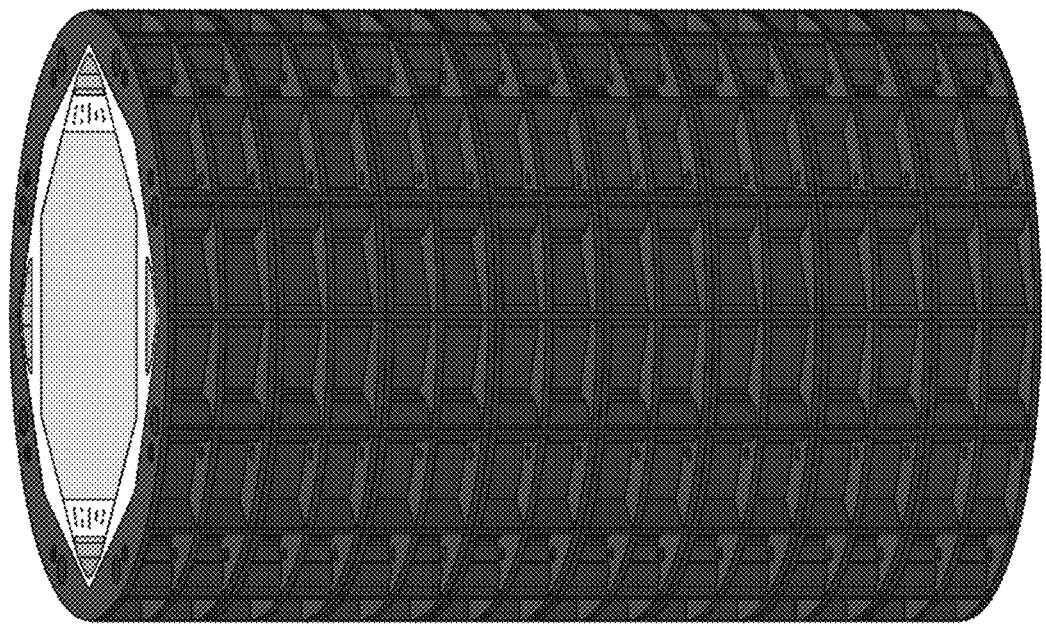
FIG. 1B shows a stack of eight of the sub-blocks of FIG. 1A before insertion into a housing.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some instances, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or, for example, a power source derived from solar, wind, or wave power. At the electrode/liquid interfaces, electrochemical half-cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ions, while such a feed to the cathode electrolyte compartment will tend to generate hydrogen gas and hydroxide ions. Generally, the hydrogen ions generated at the anode compartment will associate with free anions, such as chloride ions, to preserve charge neutrality and create hydrochloric acid solution, and analogously, the hydroxide ions generated at the cathode compartment will associate with free cations, such as sodium ions, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations.

Figure 1A:
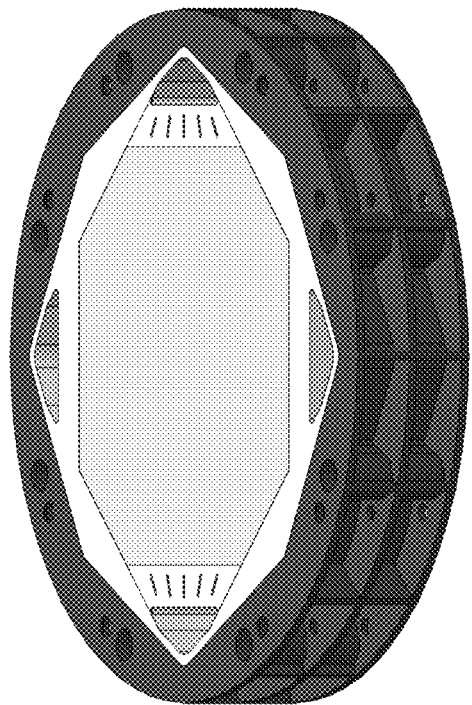
FIG. 1A shows an example of a sub-block of an electrodialysis device.
Figure 1D:
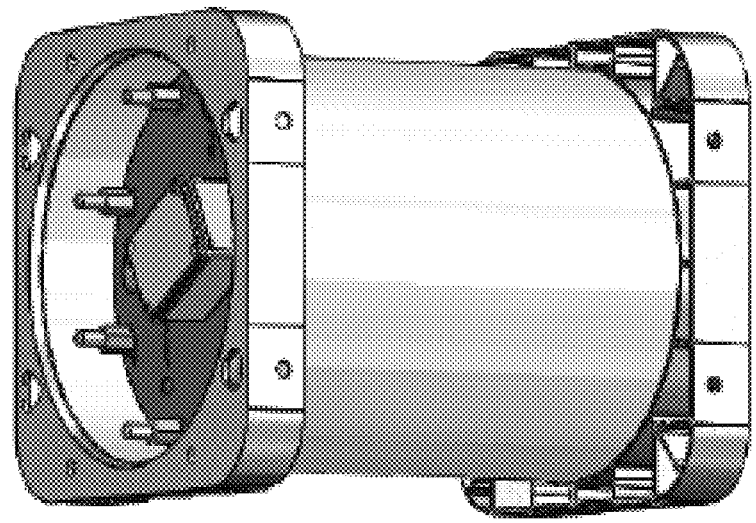
FIG. 1D shows an assembled ED device with an opaque shell.
Figure 1C:
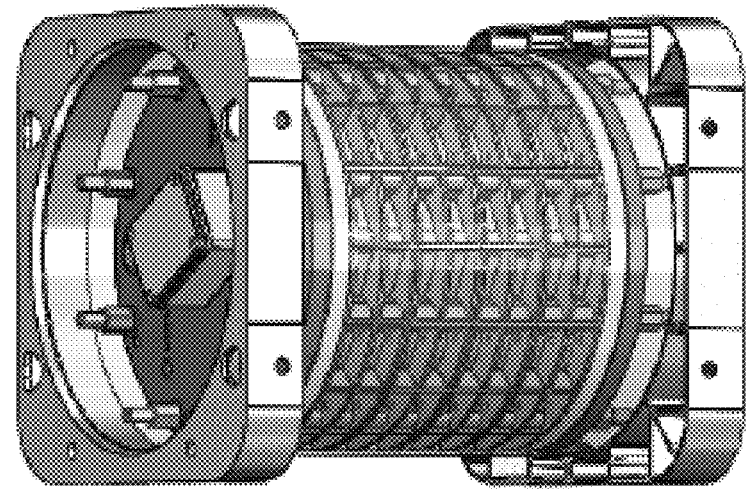
FIG. 1C shows an assembled ED device with a transparent shell.

"Cross-flow" electrodialysis (ED) devices with the dilute and concentrate streams flowing in perpendicular directions have been described in prior patents. The stack of cell pairs in a device can be assembled from one or more modular units, called sub-blocks. FIG. 1A shows an example of a sub-block. FIG. 1B shows a stack of eight sub-blocks before insertion into a housing. As the term is used herein a "cell stack" refers to a single or to a stack of multiple of the sub-blocks. FIG. 1C shows an assembled ED device with a transparent shell. FIG. 1D shows an assembled ED device with an opaque shell.

It has been found desirable to provide seals between adjacent sub-blocks in a cell stack of cross-flow ED devices. The seals may help prevent leaks that result in mixing between the dilute and concentrate streams of the ED devices and that may reduce the efficiency of the ED devices. The seals may additionally help prevent the leakage of fluid from inside to outside of the cell stack. Paths for internal cross-leakage that may result in mixing between the dilute and concentrate streams of the ED devices and for leakage out of an ED device are illustrated in the example sub-block 105 illustrated in FIG. 2A.

Figure 2A:
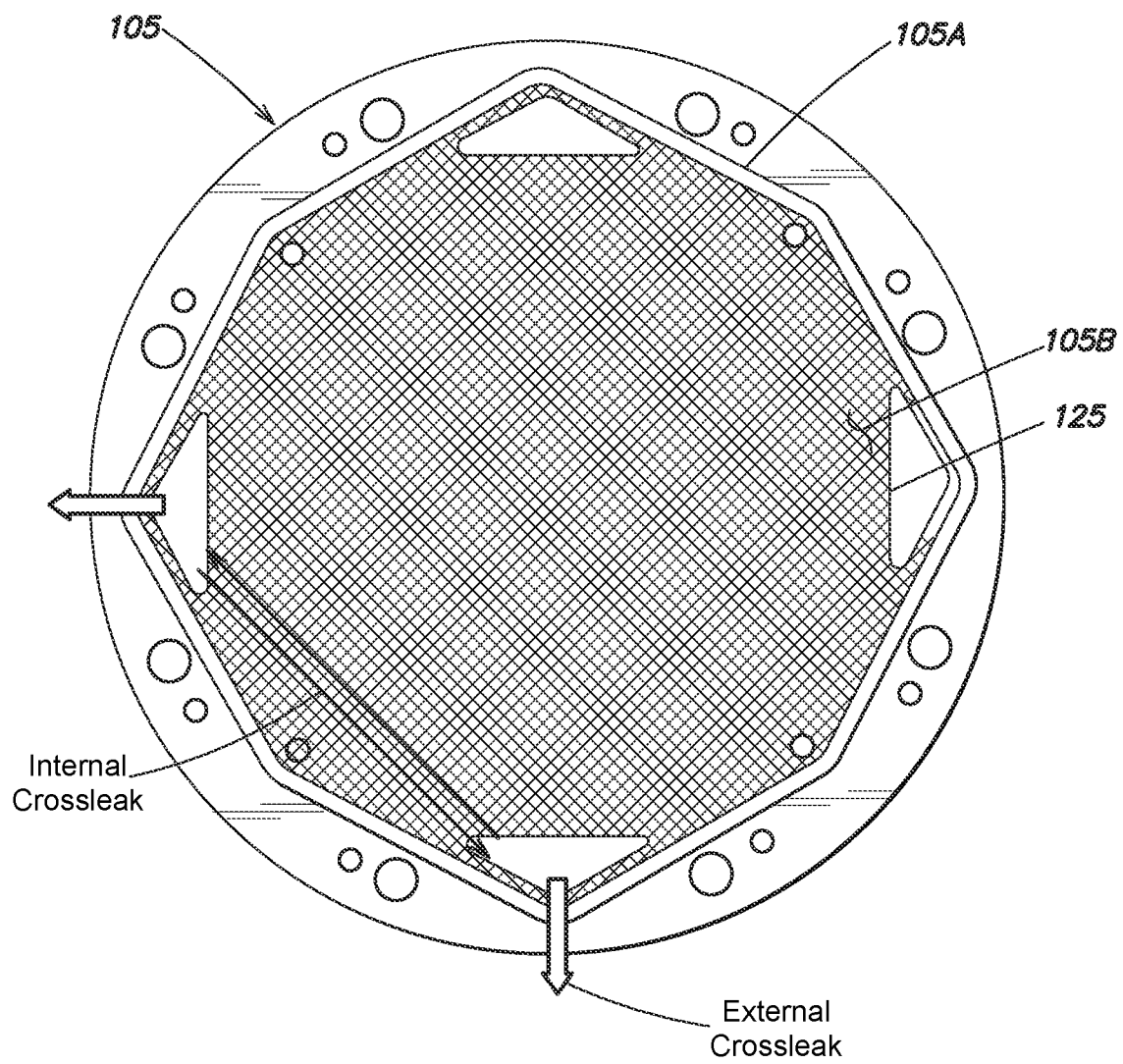
FIG. 2A illustrates potential leakage paths in a sub-block of an ED device.
Figure 2B:
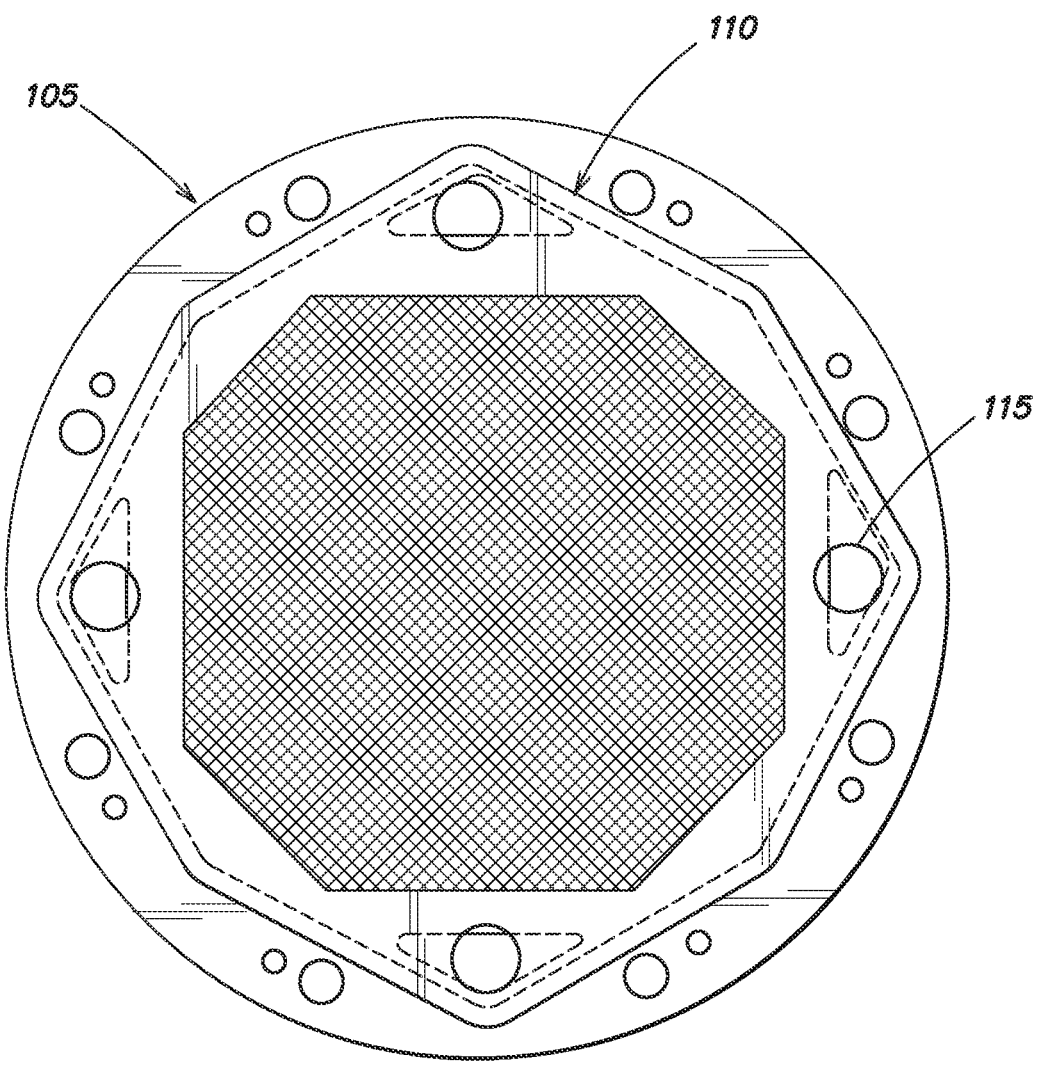
FIG. 2B illustrates an embodiment of a sealing gasket disposed on a sub-block of an ED device.
Figure 2C:
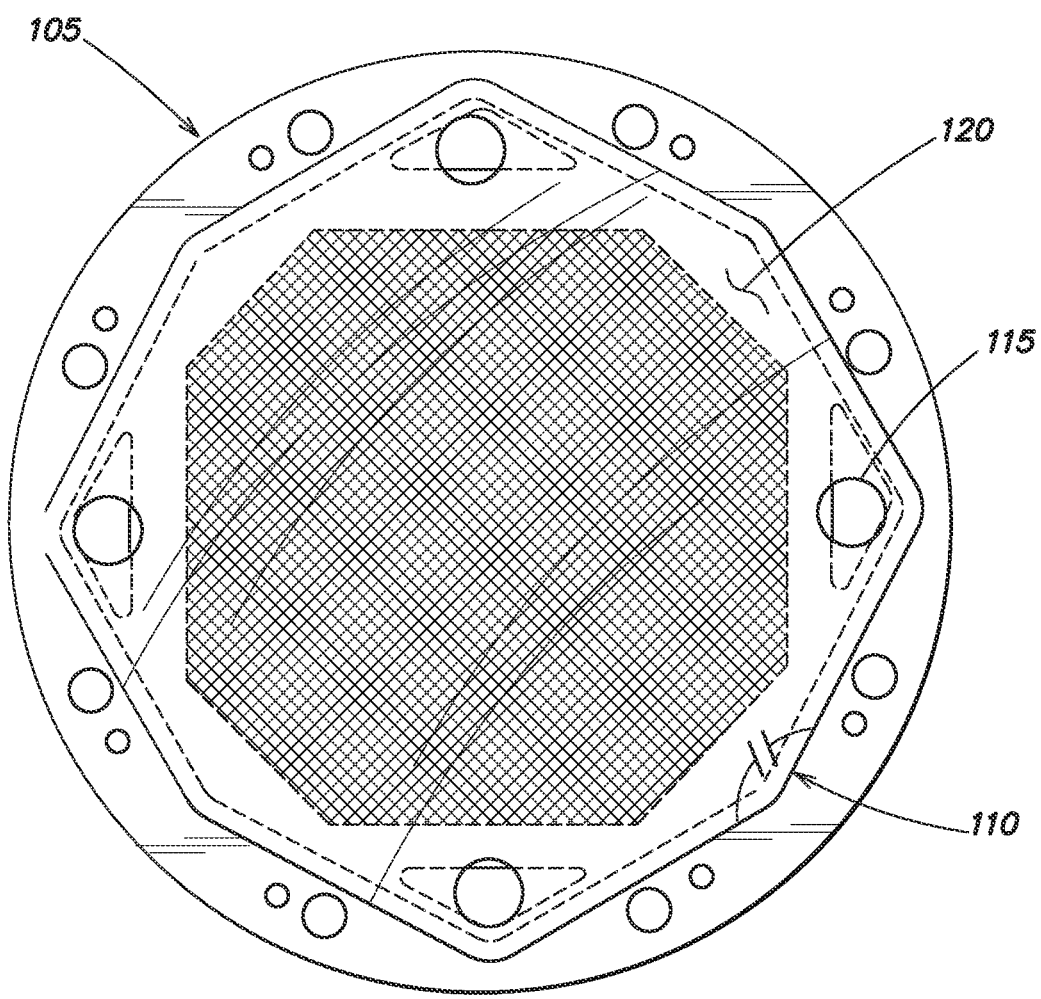
FIG. 2C illustrates a cation exchange membrane disposed on the sealing gasket of FIG. 2B.

One method of sealing between sub-blocks in a cell stack of an ED device is illustrated in FIGS. 2A-2C. The method involves laying a silicone gasket 110 on the face of a first sub-block 105, lining up cutouts 115 in the gasket 110 with the ports of the first sub-block, laying a piece of Cation Exchange Membrane (CEM) 120 on top of the gasket 110, laying another silicone gasket 110 (not shown) on top of the CEM 120, and finally bringing a second sub-block (not shown) on top of the second silicone gasket. This procedure may be repeated for each pair of adjacent sub-blocks in the cell stack. The cutouts 115 in FIG. 2A and FIG. 2B are illustrated as circular, but are typically substantially triangular to match the shape of the manifold ports 125 (as illustrated in FIG. 2A) in the sub-block 105. The cutouts 115 in the gasket 110 as well as the central open region of the gasket 110 may be die-cut.

Figure 3:
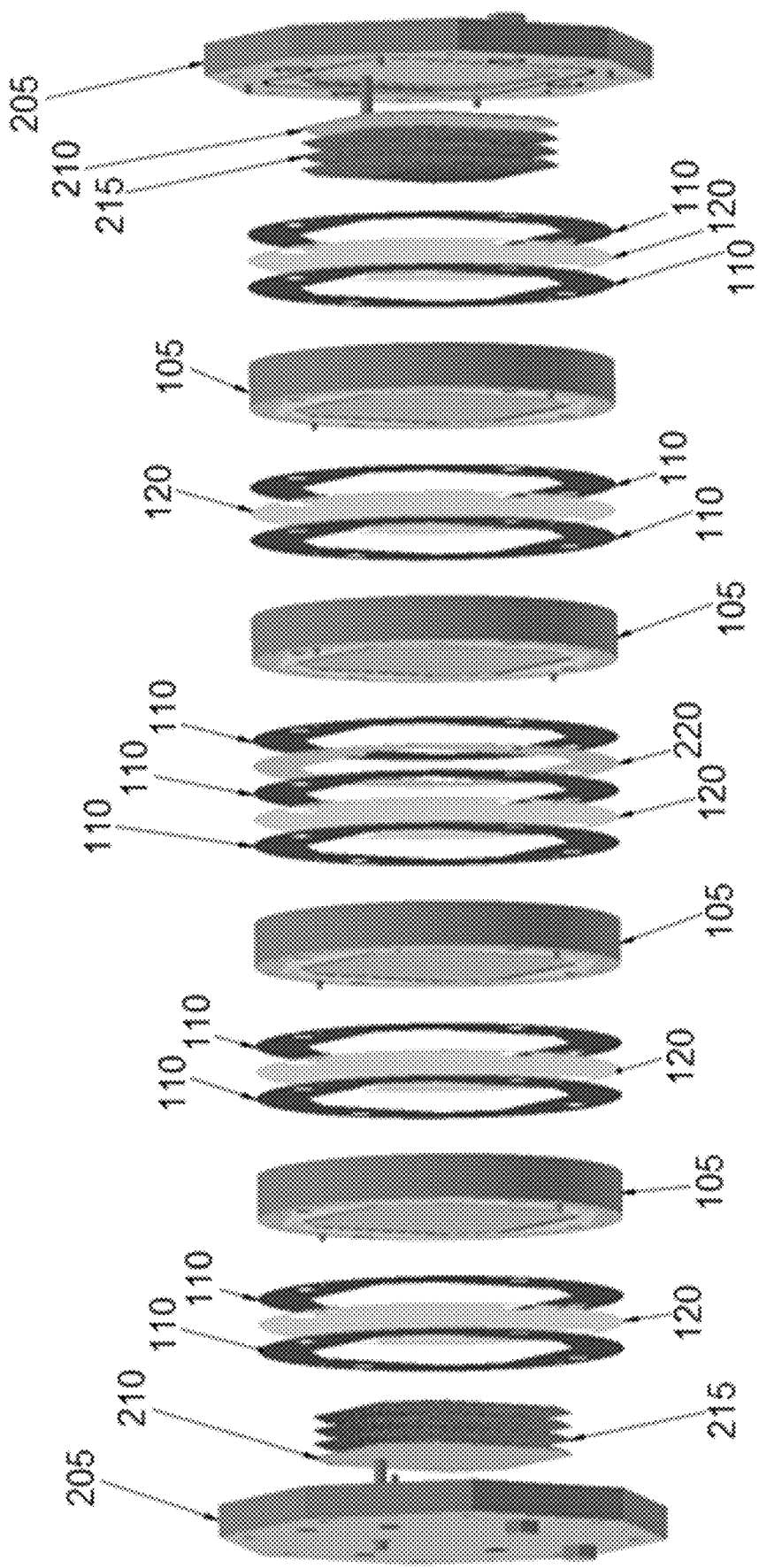
FIG. 3 shows an exploded view of an ED device with four sub-blocks.

FIG. 3 shows an exploded view of a cell stack of an ED device including four sub-blocks. The four sub-blocks 105 are disposed between two end plates 205. Electrodes 210 and electrode screens 215 are disposed between the end plates 205 and the stack of sub-blocks 105. To create a two-pass system, one of the intersub-block seals incorporates a G10 fiberglass sheet 220 that blocks the flow, as well as a third gasket 110 to seal between the CEM 120 and the G10 sheet 220.

Figure 4A:
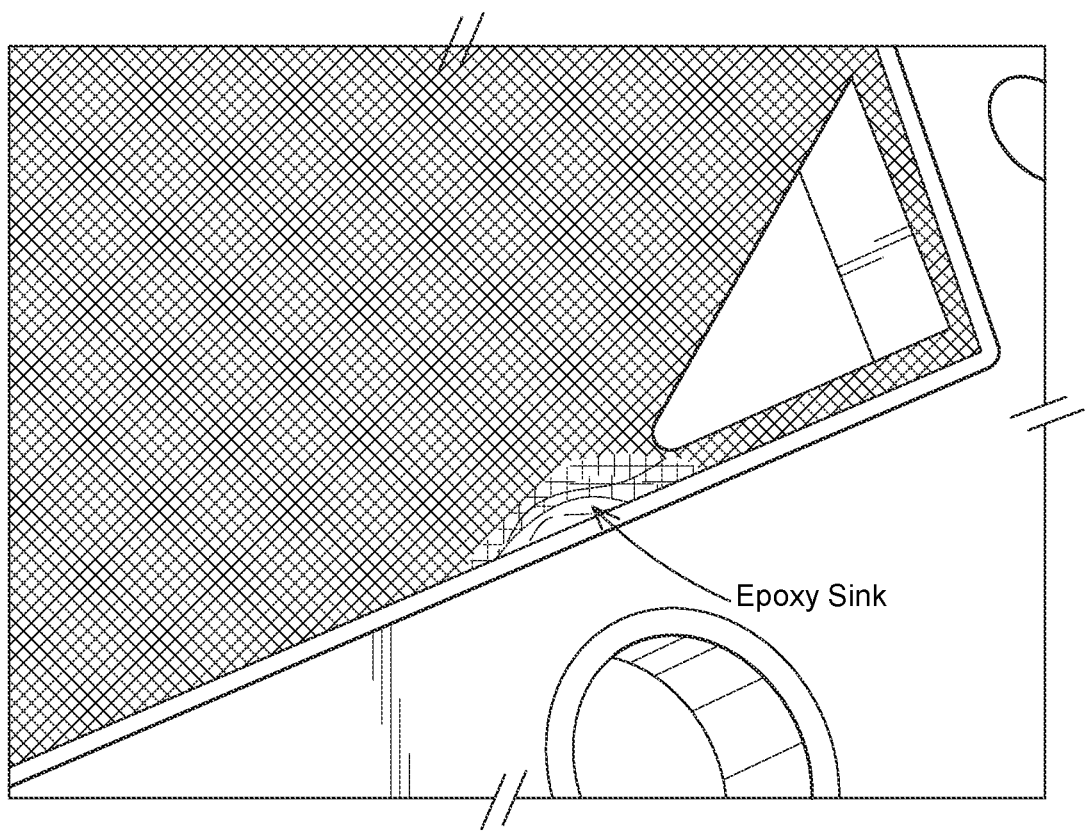
FIG. 4A illustrates a sink that may form in an epoxy layer of a sub-block during curing.
Figure 4B:
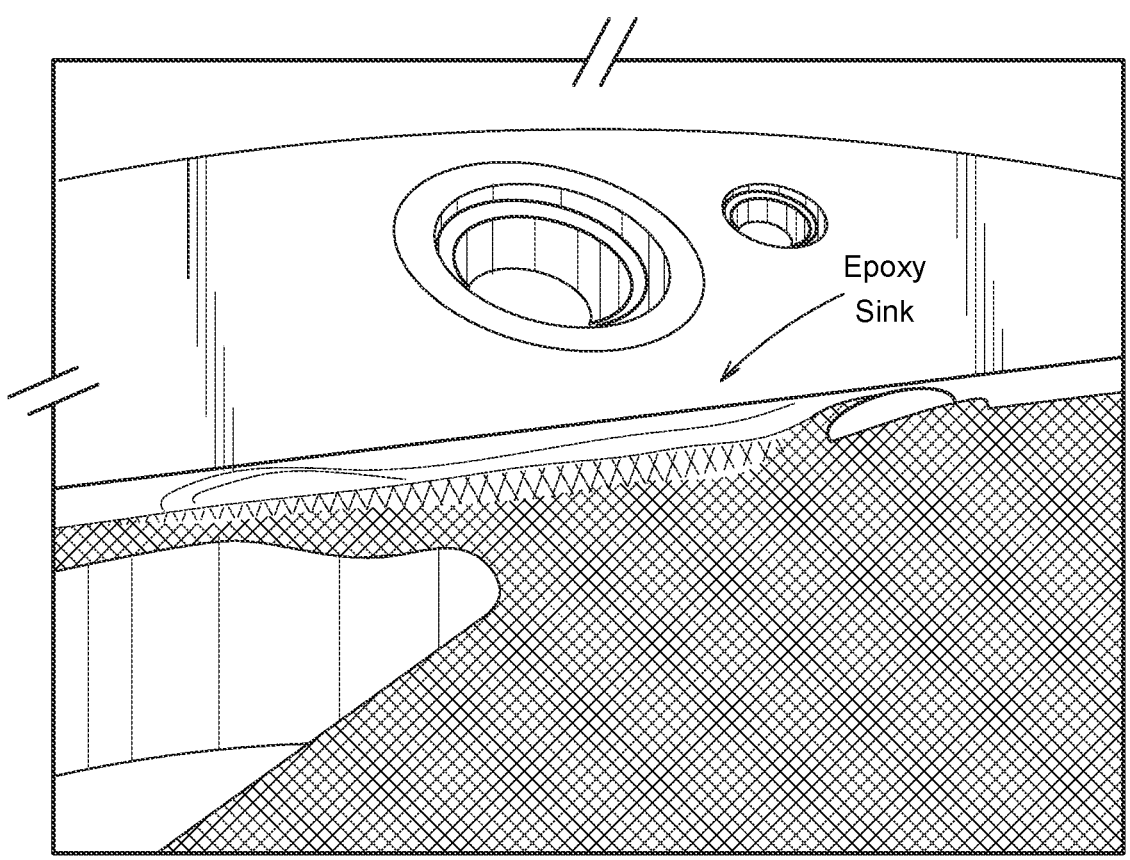
FIG. 4B is another illustration of a sink that may form in an epoxy layer of a sub-block during curing.
Figure 4C:
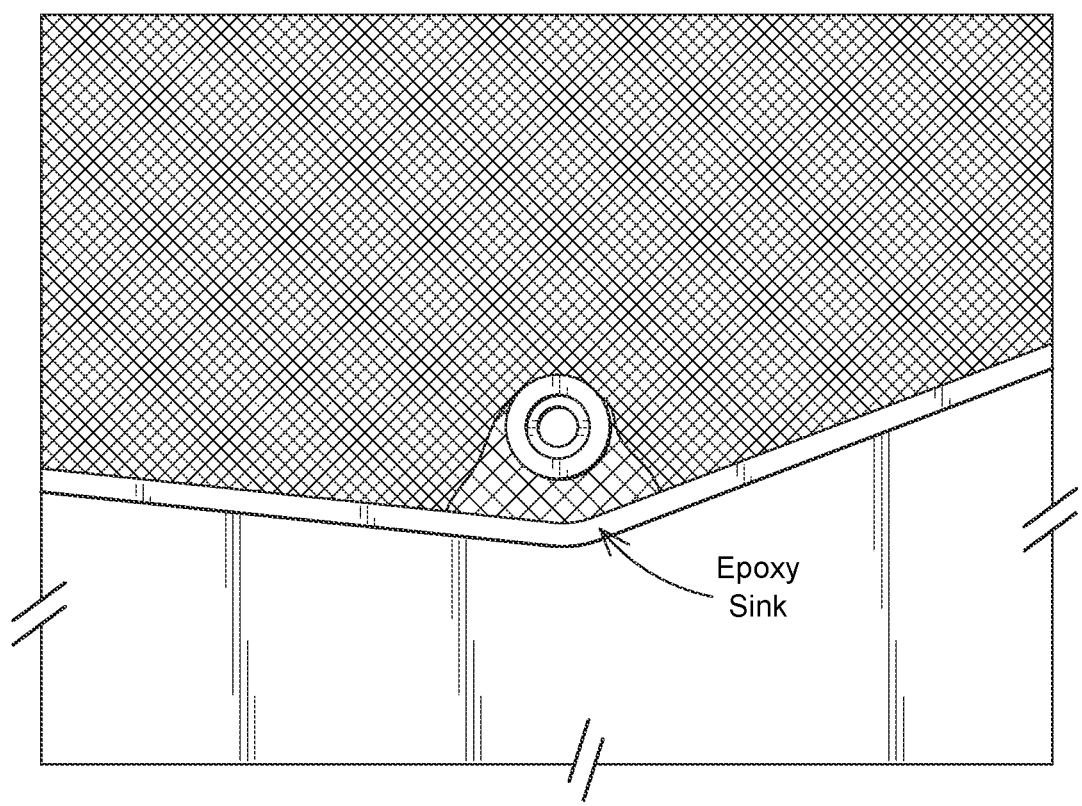
FIG. 4C is another illustration of a sink that may form in an epoxy layer of a sub-block during curing.

During fabrication of a sub-block 105, epoxy 105B may be potted in a frame 105A formed of, for example, NORYL® resin (FIG. 2A) to secure the ion exchange membranes in the frame 105A. In some instances the epoxy potted in the frame 105A may shrink during curing, leading to sinks or depressions in the epoxy layer. These sinks or depressions may be located adjacent interfaces between the epoxy and the frame or tubes defining ports through the sub-blocks 105. FIGS. 4A-4C illustrate examples of sinks that can form in the epoxy 105B during the potting process. These sinks may provide a path for leakage between the dilute and concentrate streams in the ED cell stack. Sealing against a non-flat and unpredictably uneven surface has proven to be a difficult task. The sinks in the epoxy 105B of sub-blocks 105 may be, for example, from about 200 μm to about 500 μm in depth or in some instances up to about 1 mm in depth, and present an issue the sealing solution between adjacent sub-blocks 105 has to adapt to. Silicone foam gaskets such as gaskets 110 have a high degree of compressibility, being able to take the form of the peaks and valleys in the epoxy 105B, but a sealing solution utilizing such gaskets is not especially robust. The alternative sealing means disclosed herein are improvements over the current sealing means.

It has been discovered that different sealing solutions may be advantageously utilized to prevent internal leaks that may result in mixing between the dilute and concentrate streams of an ED device cell stack and to prevent external leaks—leakage of fluid from an internal volume to outside of the cell stack. As illustrated in FIG. 2A, the paths for internal leaks may predominantly be across the epoxy potting in a sub-block 105 while the paths for external leaks may predominantly be across the surface or face of the frame portion 105A of the sub-module 105. Internal and external leaks may occur at different pressure gradients. For example, a pressure differential between diluting compartment manifolds and concentrating compartment manifolds in a single sub-block may be between about 4 psi (27.6 kPa) and about 10 psi (69 kPa). A sealing solution to prevent internal leaks between the diluting compartments and concentrating compartments should thus be designed to withstand pressures of up to about 10 psi. External leaks may occur due to the pressure differential between the inside of an ED device cell stack and the external environment, which may be between about 50 psi (345 kPa) and about 75 psi (517 kPa). A sealing solution to prevent external leaks should thus be designed to withstand these higher pressures. A sealing solution to prevent internal leaks should be designed to adapt to the sinks in the epoxy potting (about 200 μm to about 500 μm in depth or up to 1 mm in depth) while a sealing solution to prevent external leaks should be designed to adapt to irregularities or pits that may be present in the surface or face of the frame portion 105A of the sub-module 105, which may be up to about 100 μm in depth or in some instances, up to about 250 μm in depth.

Figure 5:
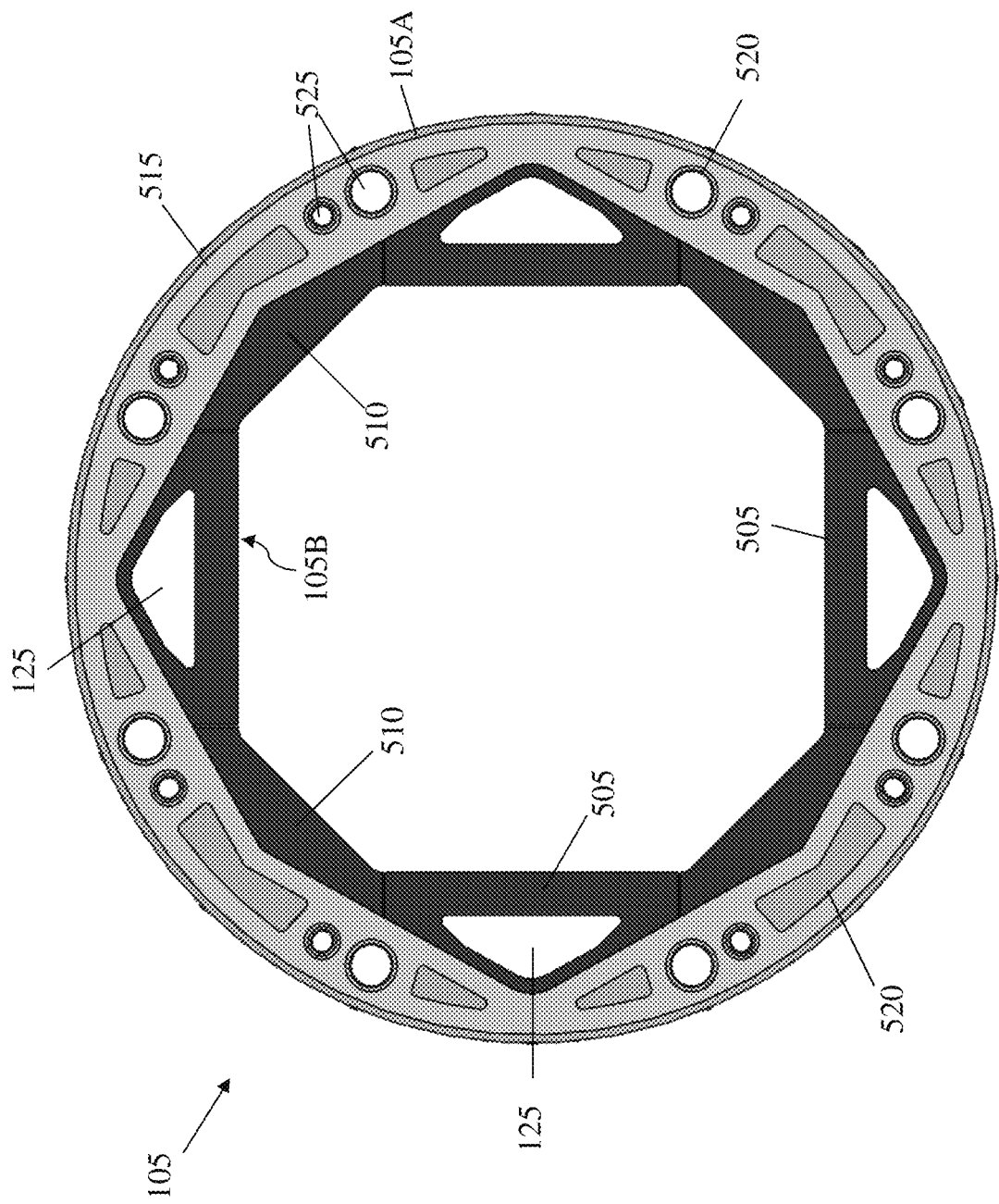
FIG. 5 illustrates an embodiment of a sealing solution to be disposed between adjacent sub-blocks of a cell stack of an ED device.

One example of a sealing solution that addresses the different considerations for internal and external leaks is presented in FIG. 5. The sealing solution of FIG. 5 includes internal low pressure seal sections 505 that are disposed on the epoxy potting layer 105B of the sub-block 105 and surround the manifold ports 125 for the diluting and concentrating compartments. The internal low pressure seal sections 505 may be adhesive backed sections of pliable closed-cell silicone foam having a hardness of about Shore 10A and a thickness of about 2 mm. The internal low pressure seal sections 505 are not limited to being formed of silicone foam. Any suitable material, for example, any suitable elastomer having an appropriate durometer rating (hardness) and chemical resistance to fluid to be treated in the device may be utilized. Upon assembly of the cell stack, the internal low pressure seal sections 505 may compress to between about 0.4 mm and about 1.5 mm in thickness. The internal low pressure seal sections 505 may be configured to prevent leakage between the depleting compartments and concentrating compartments under conditions in which the channel portions exhibit sinks of from about 200 μm to about 500 μm in depth or less than about 1 mm in depth.

Internal volume displacement sections 510 may be disposed between the internal low pressure seal sections 505 on the surface of the epoxy potting 105B. The internal volume displacement sections 510 may fill portions between adjacent sub-blocks that might otherwise allow for stagnant fluid to accumulate during operation. The internal volume displacement sections 510 may be formed from a similar material as the internal low pressure seal sections 505 or a softer material and may also be adhesive backed. The low pressure seal sections 505 and internal volume displacement sections 510 are disposed on inlet and outlet channel portions of the sub-block 105, but do not cover active areas of membranes within the sub-block 105. The active area of the membrane in a sub-block is illustrated at 105D in FIG. 6D below. The inlet and outlet channel portions of the sub-block 105 occupy the region 105C surrounding the active area of the membrane 105D.

A separate external high pressure seal 515 is disposed on the frame portion 105A of the sub-block 105. The external high pressure seal 515 may be formed of a harder material than the internal low pressure seal sections 505, for example, silicone rubber having a hardness of about Shore 70A and a thickness of between about 0.8 mm and about 1 mm. The external high pressure seal 515 may be in the form of a sheet of silicone rubber. The external high pressure seal 515 may be in the form of a sheet of non-porous (non-foam) silicone rubber. The external high pressure seal 515 may be configured to prevent leakage from the internal volume of the electrochemical separation device under conditions in which the frames exhibit pits of up to about 100 μm in depth or less than about 250 μm in depth. The external high pressure seal 515 is not limited to being formed of silicone rubber. Any suitable material, for example, any suitable elastomer having an appropriate durometer rating (hardness) and chemical resistance to fluid to be treated in the device may be utilized.

Apertures 520 may be defined in the external high pressure seal 515 to provide openings for conduits 525 that may accommodate tie rods for holding the cell stack together or for passage of electrical connections. The apertures 520 also reduce the cross-sectional area of the external high pressure seal 515 so that a higher pressure per unit area may be applied to the external high pressure seal 515 upon assembly and application of compressive force across the cell stack to facilitate compression of the external high pressure seal 515. Apertures 520 that are defined in the external high pressure seal 515 over portions of the frame not including conduits may be considered defined over closed sections or bare areas of the frame 105A. Upon assembly of the cell stack, the external high pressure seal 515 may compress by, for example, about 50%.

Figure 6A:
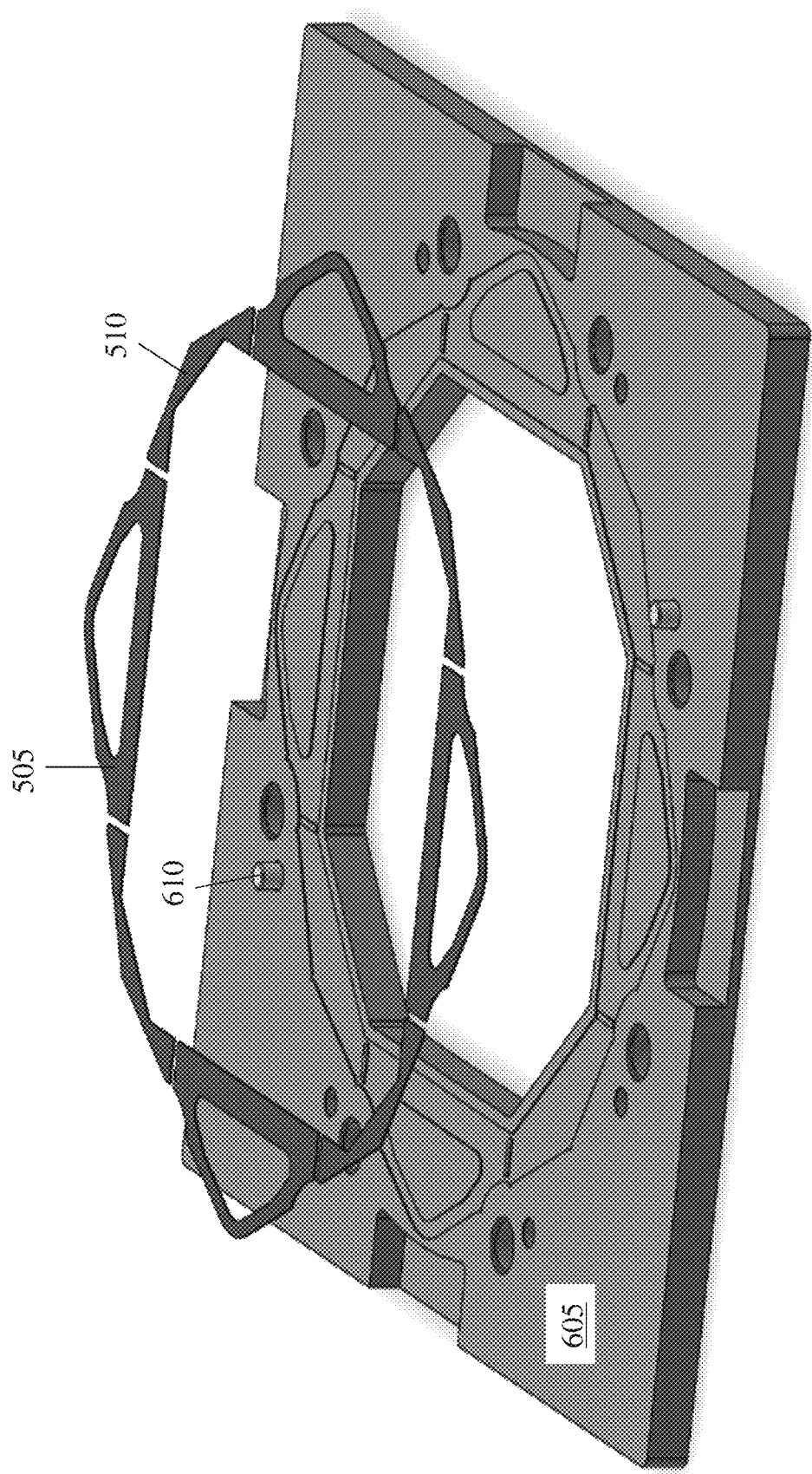
FIG. 6A illustrates an act in a method of applying the sealing solution of FIG. 5 to a sub-block of an ED device.
Figure 6B:
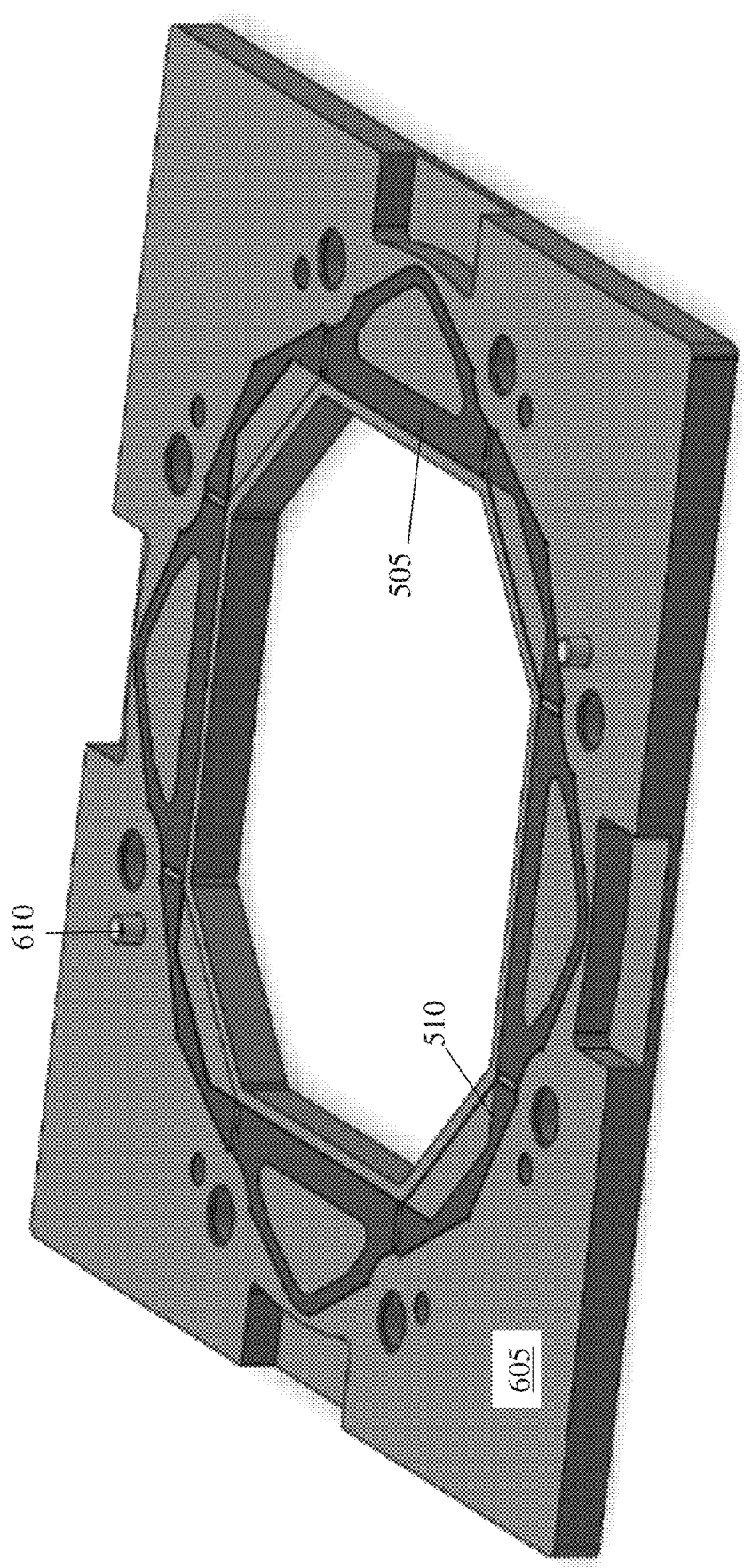
FIG. 6B illustrates another act in the method of applying the sealing solution of FIG. 5 to a sub-block of an ED device.
Figure 6C:
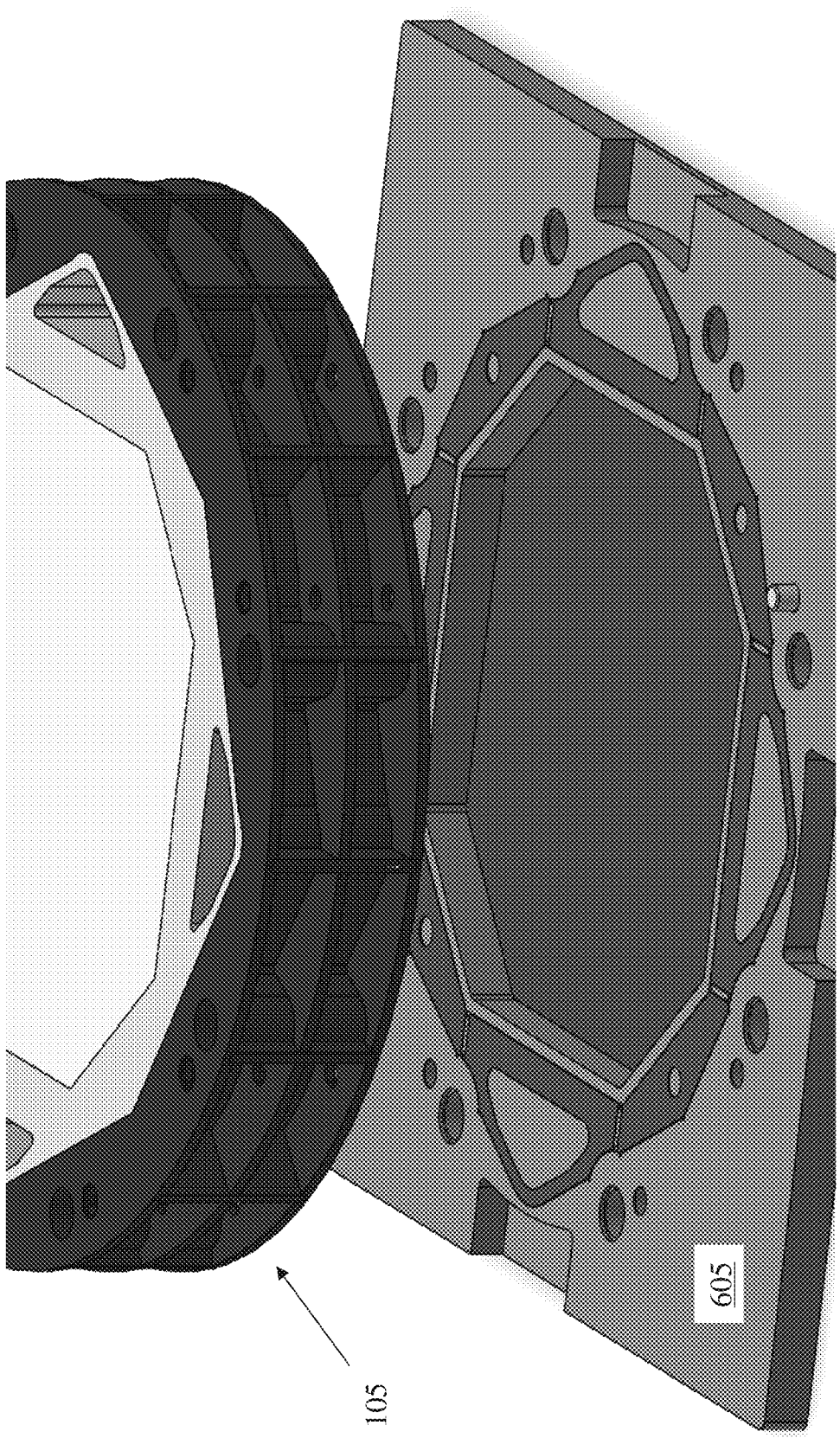
FIG. 6C illustrates another act in the method of applying the sealing solution of FIG. 5 to a sub-block of an ED device.
Figure 6D:
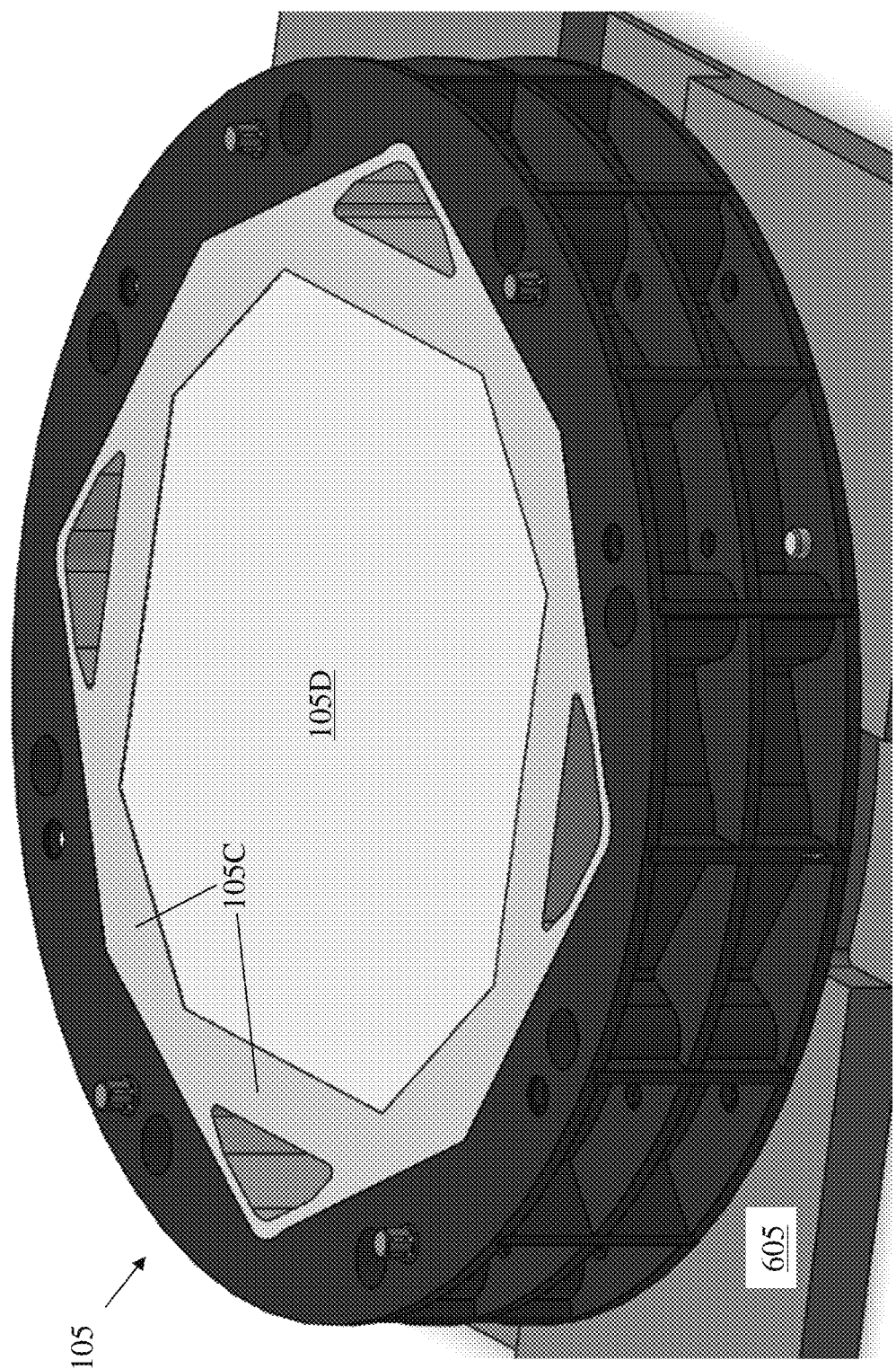
FIG. 6D illustrates another act in the method of applying the sealing solution of FIG. 5 to a sub-block of an ED device.
Figure 6E:
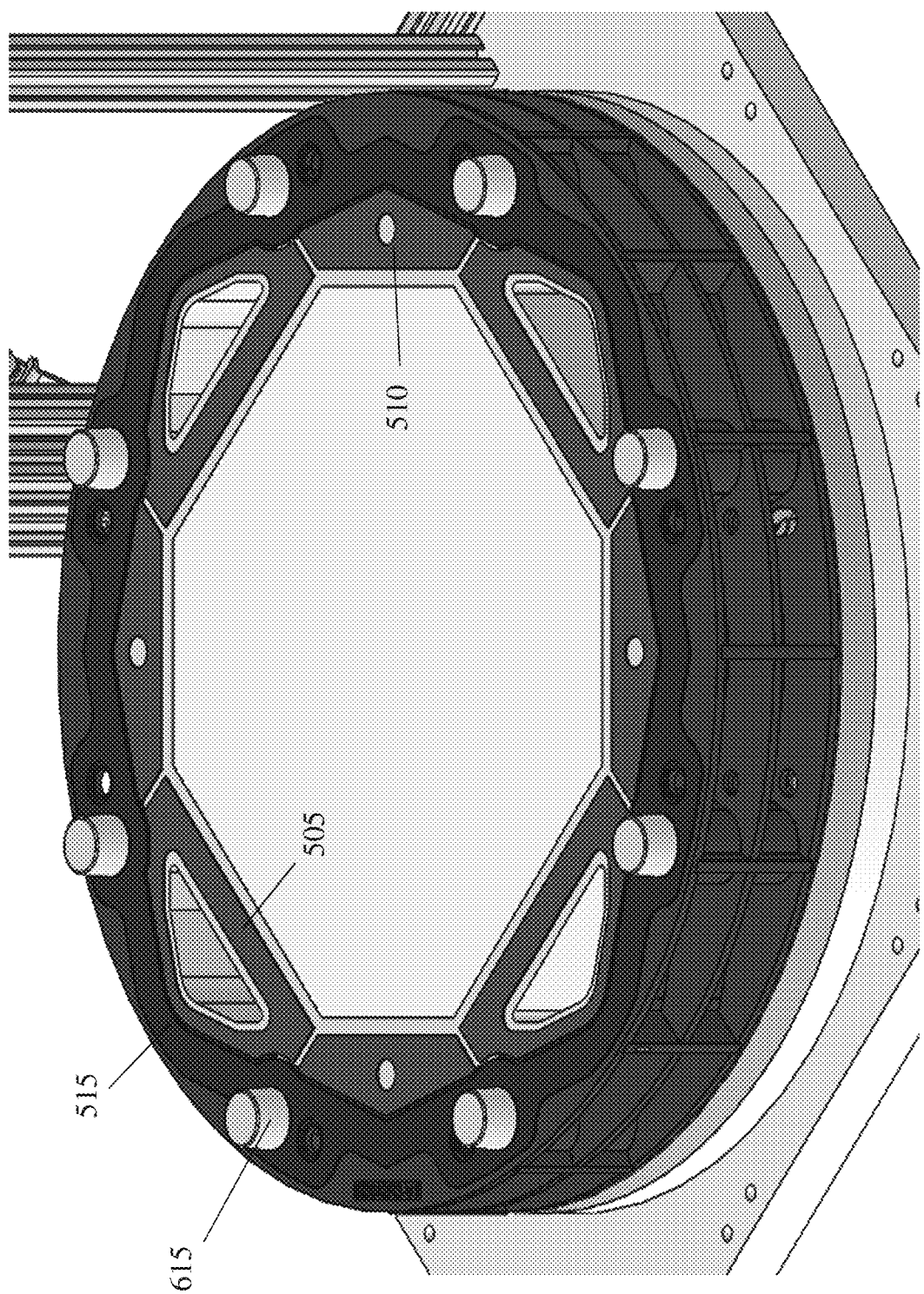
FIG. 6E illustrates another act in the method of applying the sealing solution of FIG. 5 to a sub-block of an ED device.

A method of applying the sealing solution of FIG. 5 to a sub-block 105 is illustrated in FIGS. 6A-6E. As illustrated in FIG. 6A, the internal low pressure seal sections 505 and internal volume displacement sections 510 may be placed in a jig 605 having cutouts 610 to accommodate these sections. The internal low pressure seal sections 505 and internal volume displacement sections 510 may be placed in the jig 605 with their adhesive-backed sides facing upward. FIG. 6B illustrates the internal low pressure seal sections 505 and internal volume displacement sections 510 disposed in the jig 605. A sub-block 105 to which the sealing solution is to be attached is then lowered onto the jig 605 in which the internal low pressure seal sections 505 and internal volume displacement sections 510 have been placed, as illustrated in FIG. 6C. Alignment pins 610 may be included in the jig 605 and may cooperate with apertures in the sub-block frame 105A to properly align the sub-block 105 to the internal low pressure seal sections 505 and internal volume displacement sections 510. FIG. 6D illustrates the sub-block mounted onto the jig 605 so that the internal low pressure seal sections 505 and internal volume displacement sections 510 adhere to the lower surface of the sub-block 105. The sub-block 105 may be removed from the jig 605 and introduced to a module assembly being built as illustrated in FIG. 6E. Removable alignment pins 615 may be placed in conduits 525 (see FIG. 5) in the sub-block 105 to facilitate alignment of the external high pressure seal 515 on the sub-block 105. The external high pressure seal 515 may be manually applied on the frame portion 105A of the sub-block 105, after which the alignment pins 615 may be removed.

It should be noted that the external high pressure seal 515 may have different shapes in different embodiments. For example, in the embodiment illustrated in FIG. 5, the external high pressure seal 515 has a circular periphery and apertures 520 formed about the conduits 525 as well as apertures over bare areas of the surface of the frame 150A. In the embodiment illustrated in FIG. 6E, the external high pressure seal 515 includes a periphery that is non-circular and has no apertures 520 other than those formed about the conduits 525 in the frame 105A.

Figure 7A:
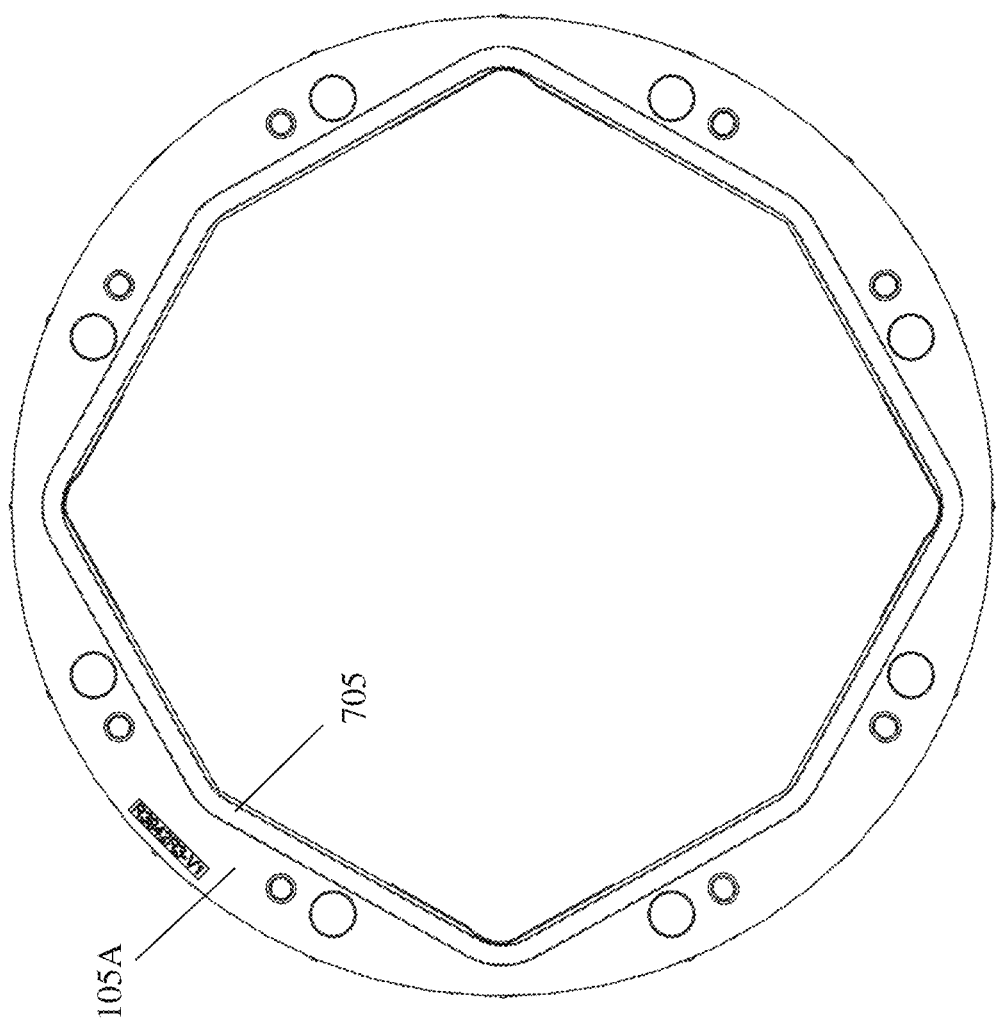
FIG. 7A illustrates a portion of another embodiment of a sealing solution on a face of a frame of a first sub-block.
Figure 7B:
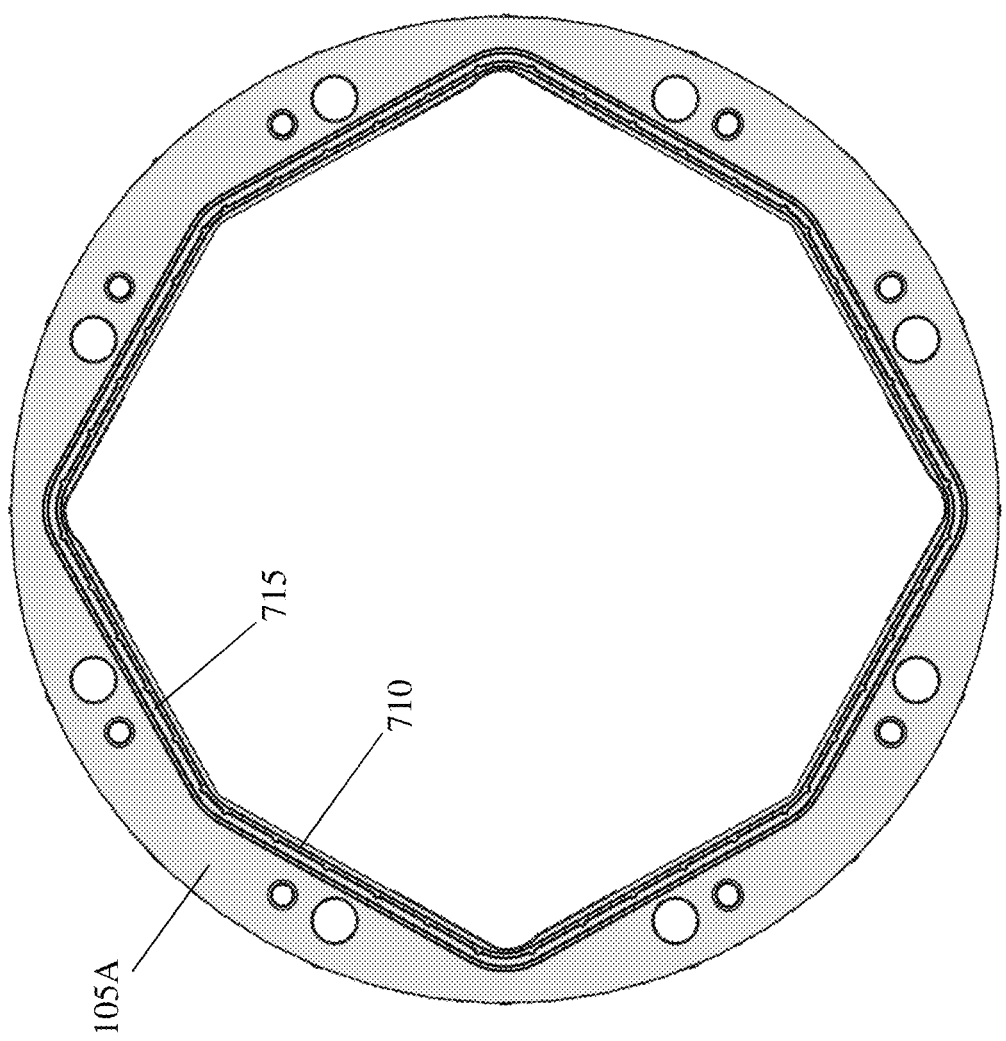
FIG. 7B illustrates a portion of the other embodiment of the sealing solution on a face of a frame of a second sub-block.
Figure 7C:
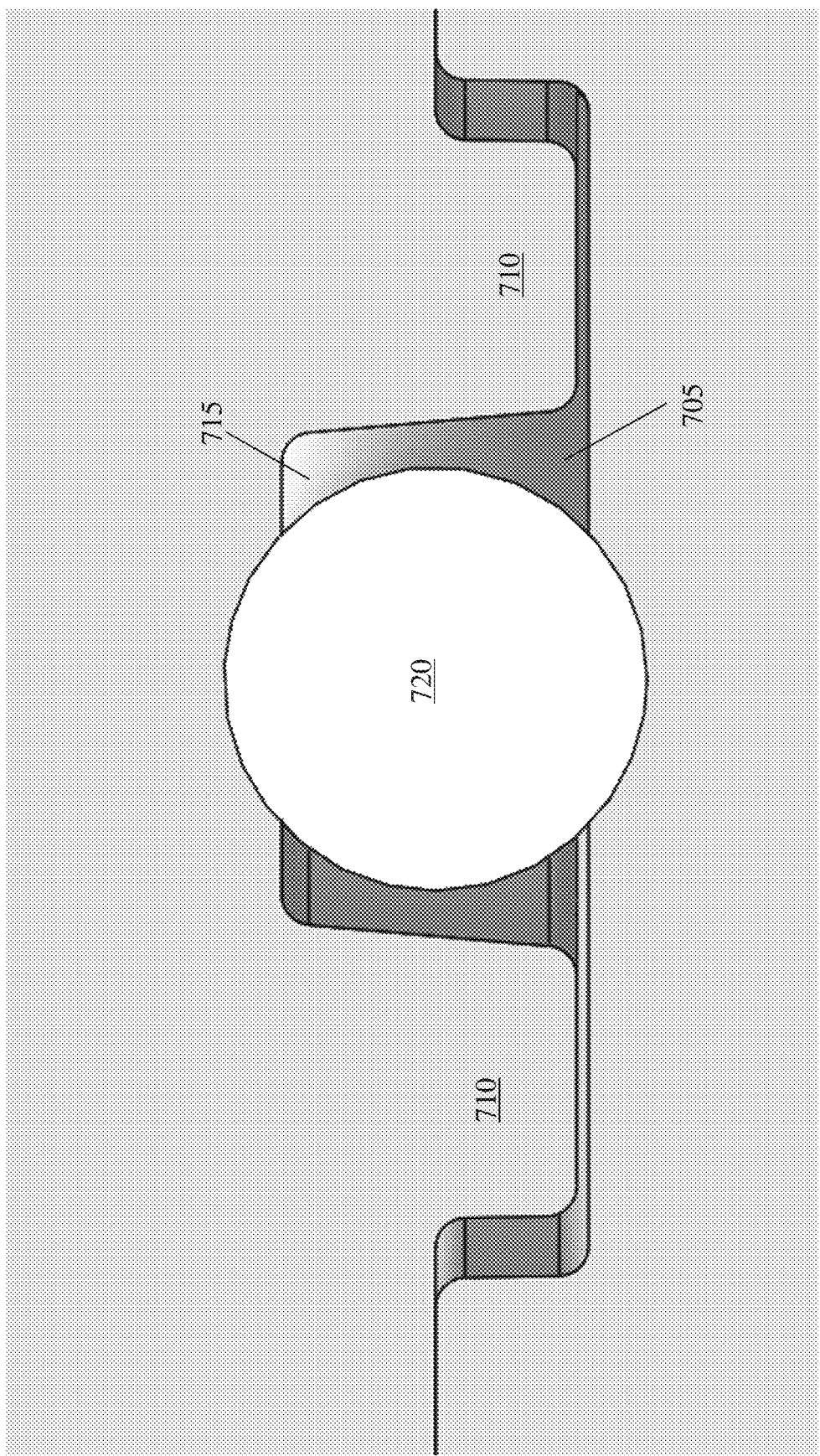
FIG. 7C illustrates the first sub-block mounted to the second sub-block.

An alternative embodiment of an external high pressure seal arrangement is illustrated in FIGS. 7A-7C. In the embodiment illustrated in FIGS. 7A-7C, a first surface (upper or lower) of a frame 105A of a first sub-block 105 includes a female slot 705 (FIG. 7A). A second surface (lower or upper) of a frame 105A of a second sub-block 105 that is to be disposed against the first surface of the frame 105A of the first sub-block 105 includes a male protrusion 710 defining an O-ring groove 715 (FIG. 7B). FIG. 7C illustrates the frame 105A of the first sub-block 105 mounted to the frame 105A of the second sub block 105 with an O-ring 720 disposed within the O-ring groove 715. The embodiment of FIGS. 7A-7C may have an advantage over that of FIG. 5 in that the frames 105A may be placed in direct contact, minimizing the spacing between adjacent sub-blocks 105 to form a more compact cell stack.

Figure 8A:
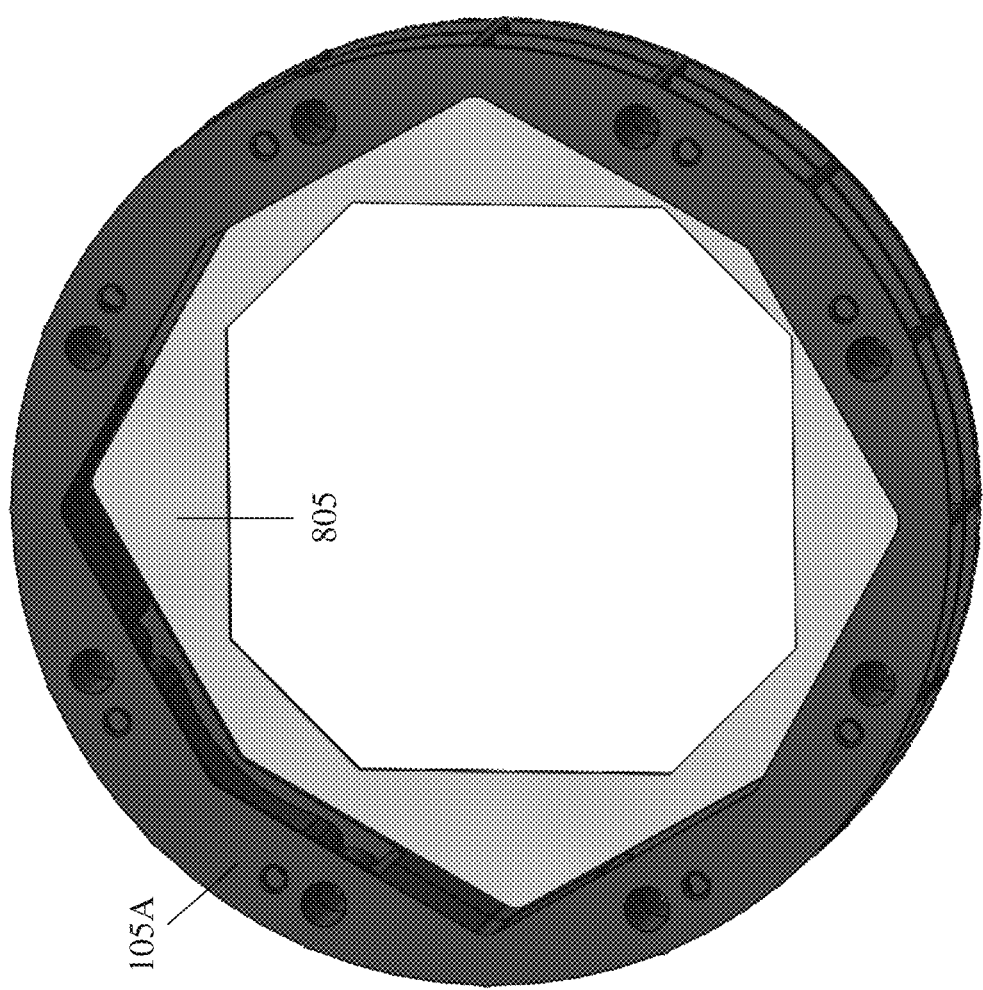
FIG. 8A is a view from below of a spacer bonded to a face of a sub-block.
Figure 8B:
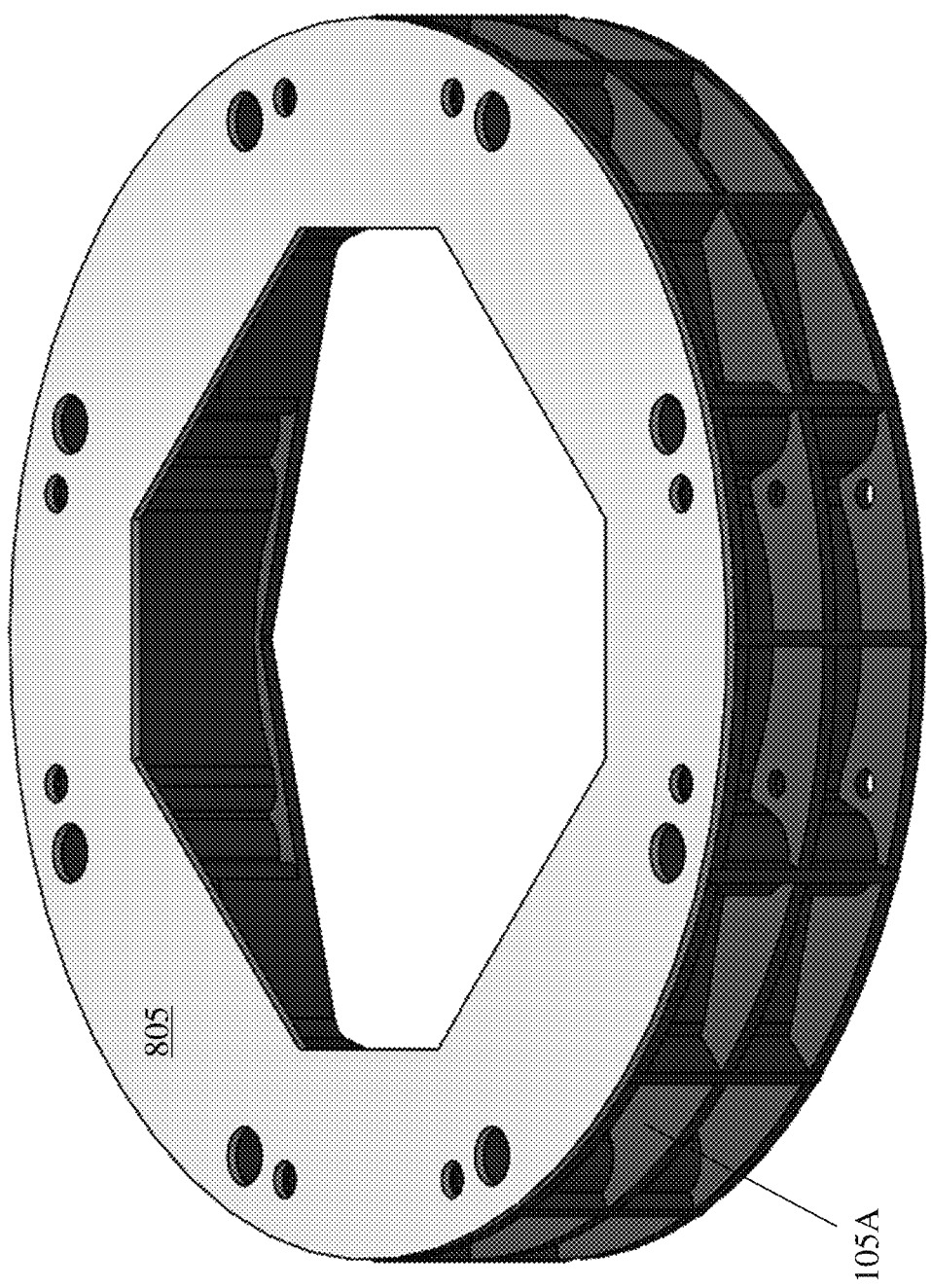
FIG. 8B is a perspective view of the spacer bonded to the face of the sub-block of FIG. 8A.
Figure 8C:
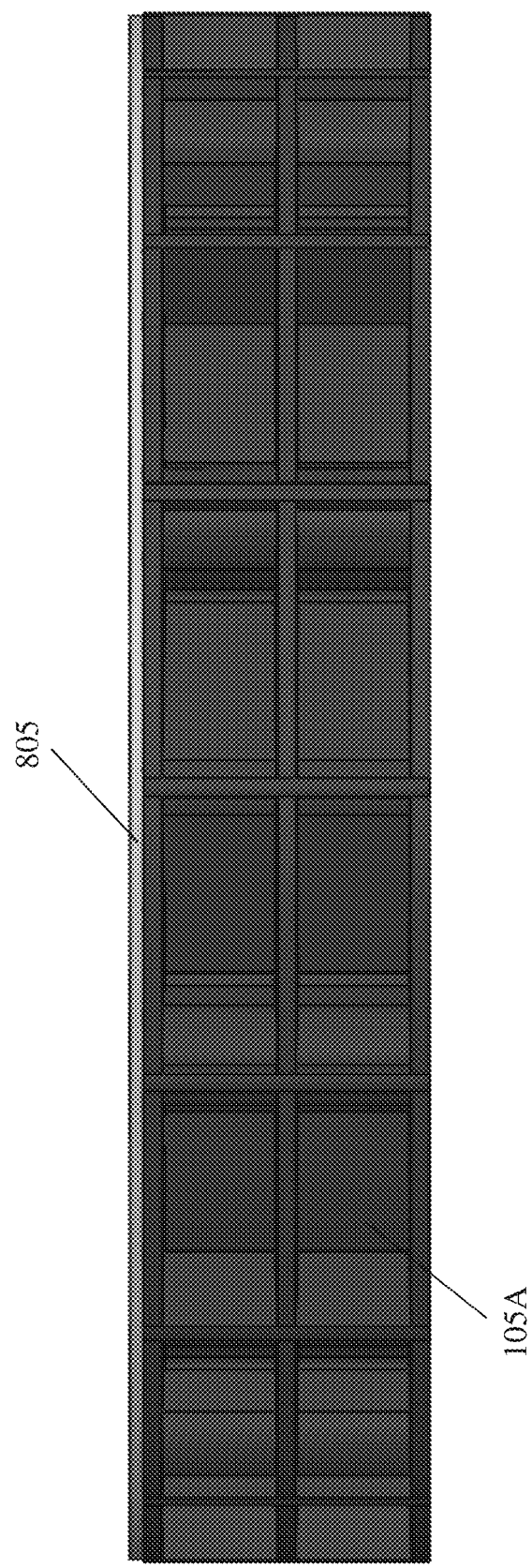
FIG. 8C is a plan view of the spacer bonded to the face of the sub-block of FIG. 8A.

In accordance with another aspect, an improved method of sealing a sub-module 105 at the end of a cell stack of an ED device to an end plate 205 (also referred to herein as an end-block 205) housing an electrode 210 and associated screens 215 (see FIG. 3) is provided. The method includes bonding a spacer 805 to the topmost surface of a sub-block frame 105A prior to potting. The spacer 805 may be bonded to the sub-block frame 105A using, for example, a hot-melt adhesive or epoxy. An example of a spacer 805 bonded to a sub-block frame 105A is illustrated from below in FIG. 8A, in a perspective view in FIG. 8B, and in plan view in FIG. 8C.

Figure 9A:
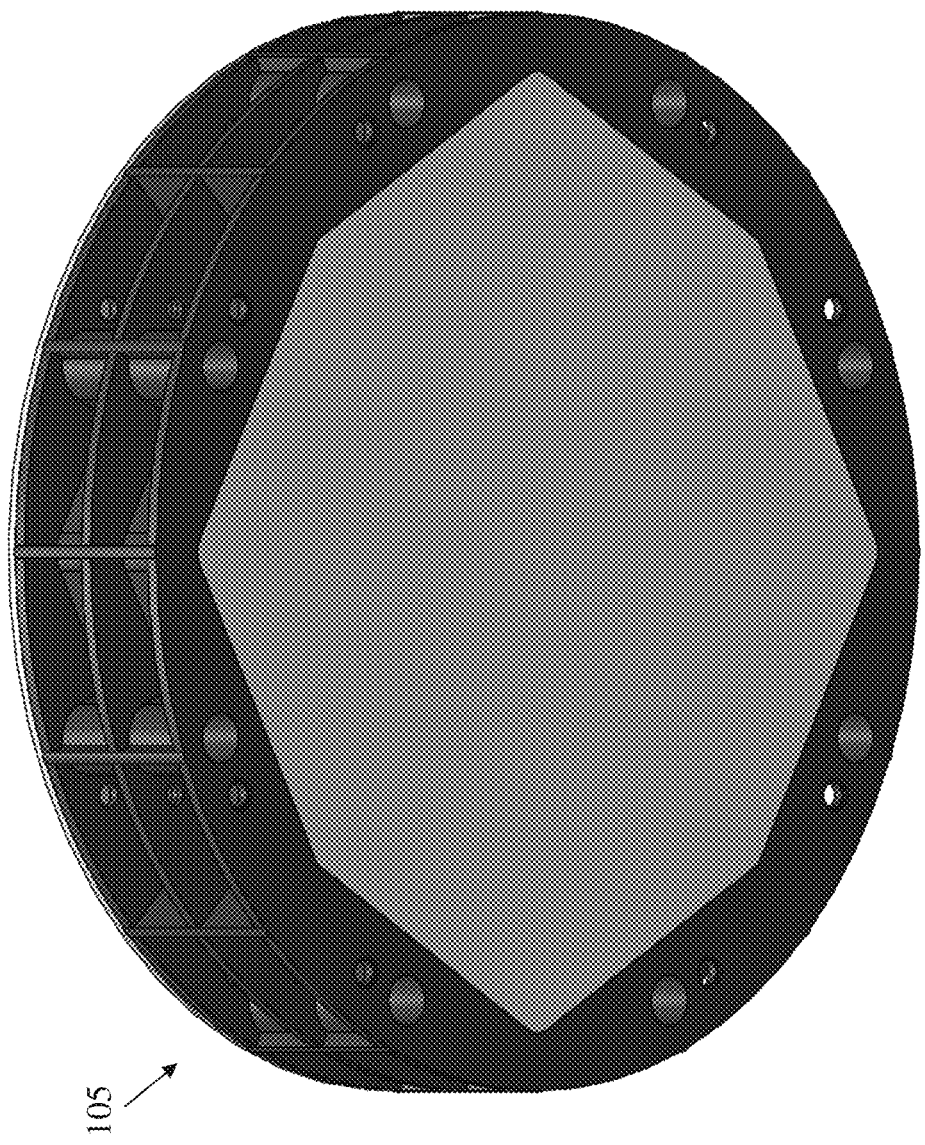
FIG. 9A is a view from below of the sub-block of FIG. 8A potted with epoxy.
Figure 9B:
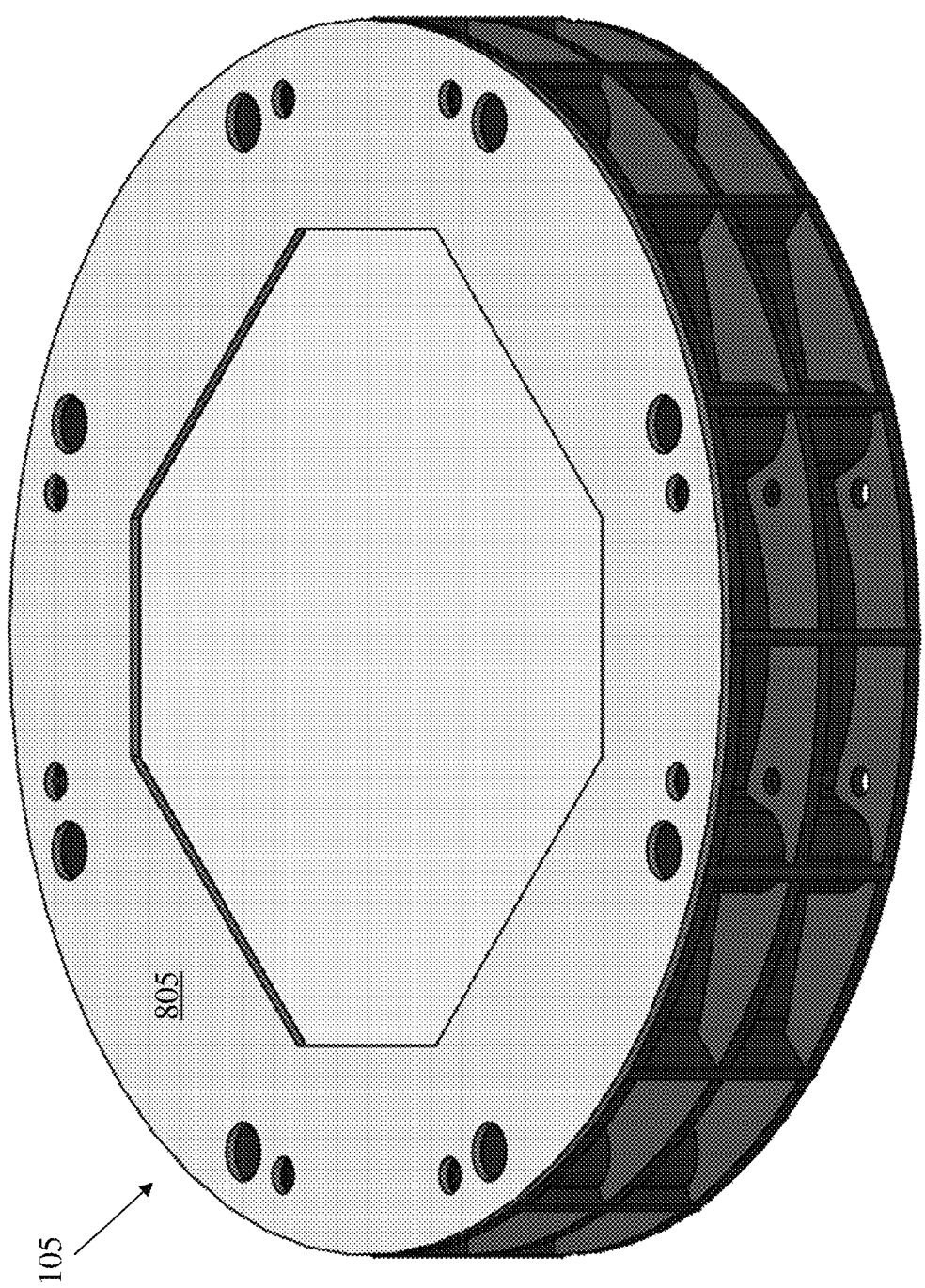
FIG. 9B is a view from above of the sub-block of FIG. 8A potted with epoxy.
Figure 9C:
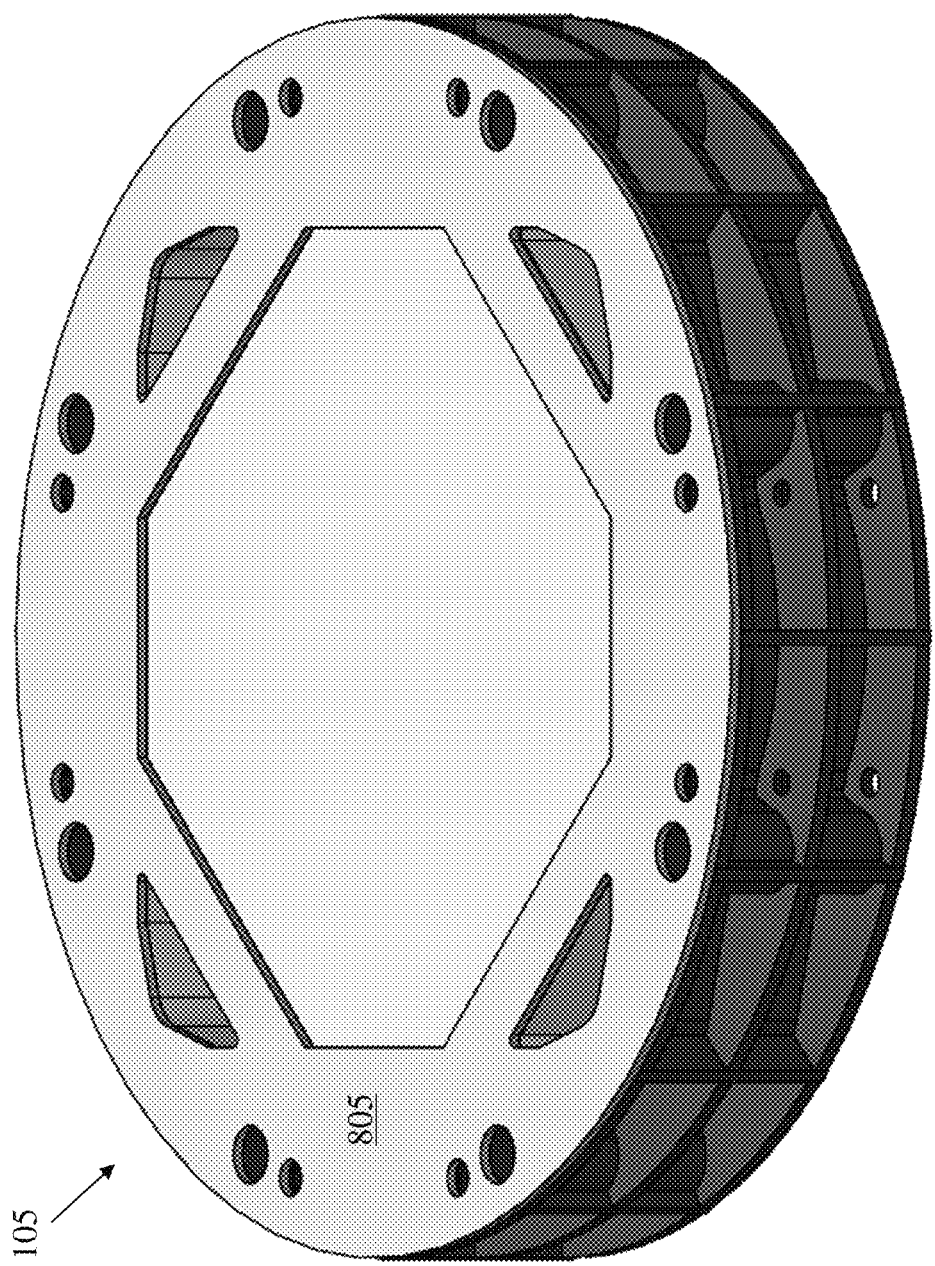
FIG. 9C illustrates the spacer of the sub-block of FIG. 8A cut to allow access to internal portions of the sub-block.

The sub-block 105 with attached spacer 805 is potted with epoxy as illustrated in FIGS. 9A and 9B and waterjet cut (FIG. 9C) to access the inner sub-block compartments.

Figure 10A:
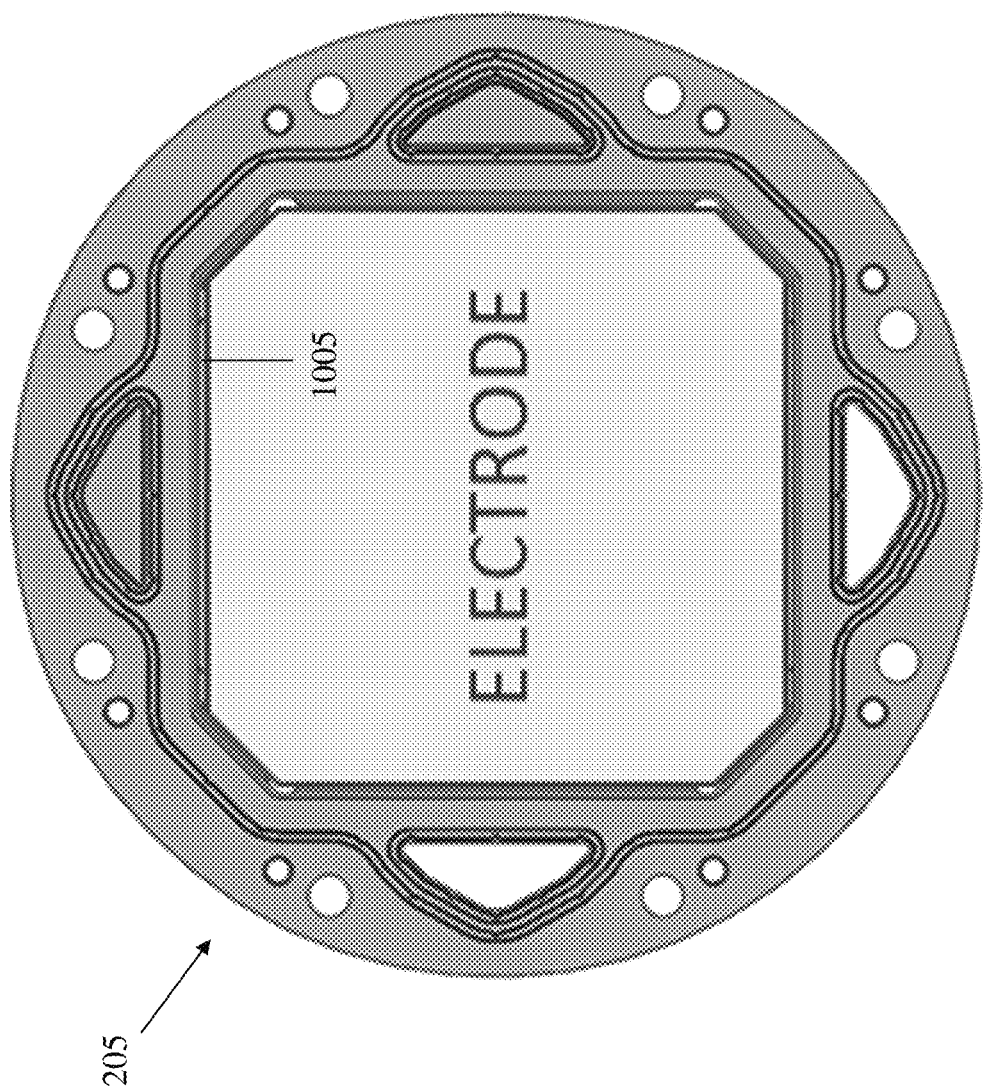
FIG. 10A illustrates an embodiment of an end-block of an ED device.
Figure 10B:
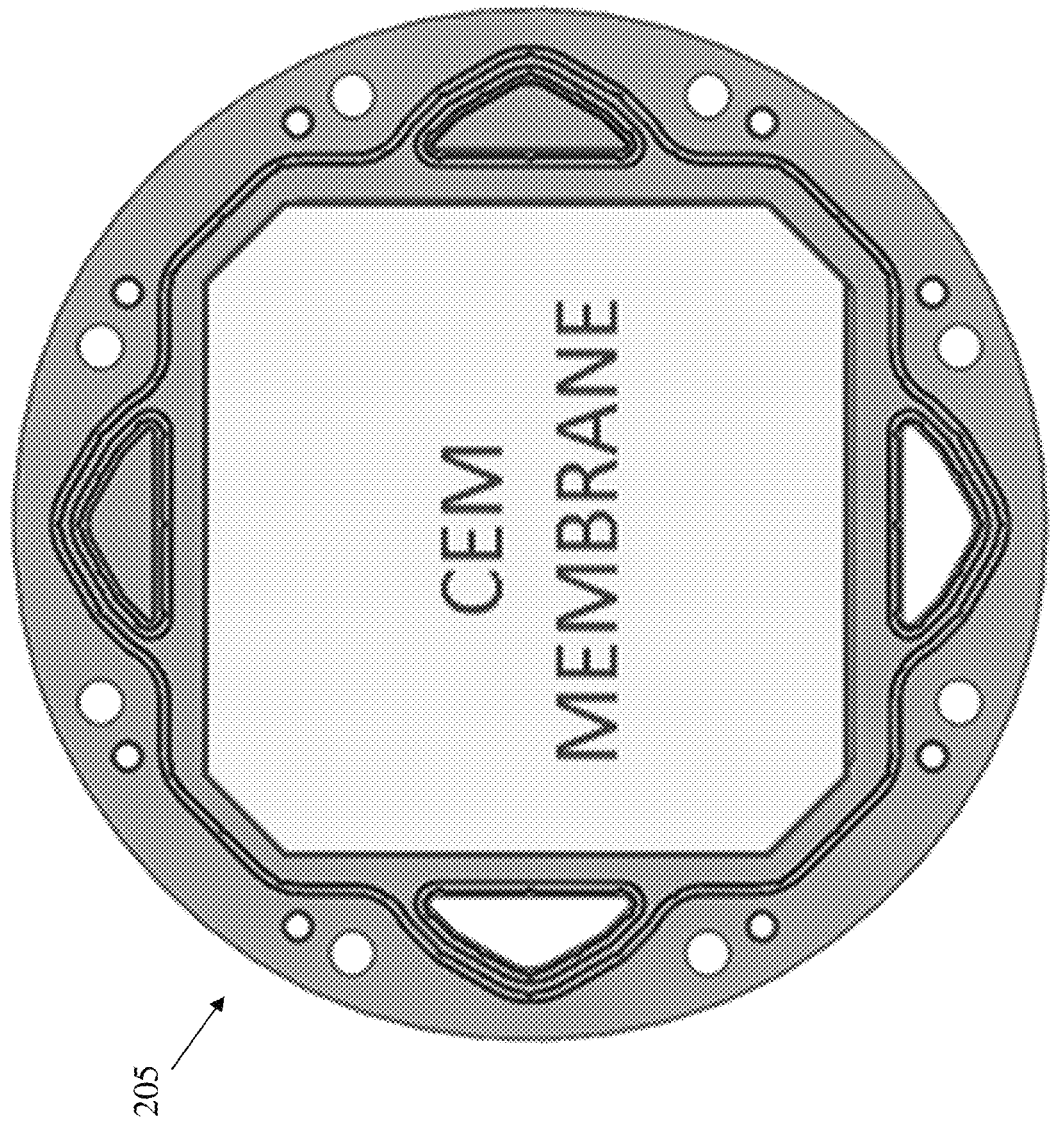
FIG. 10B illustrates the end block of FIG. 10A fitted with a cation exchange membrane.
Figure 10C:
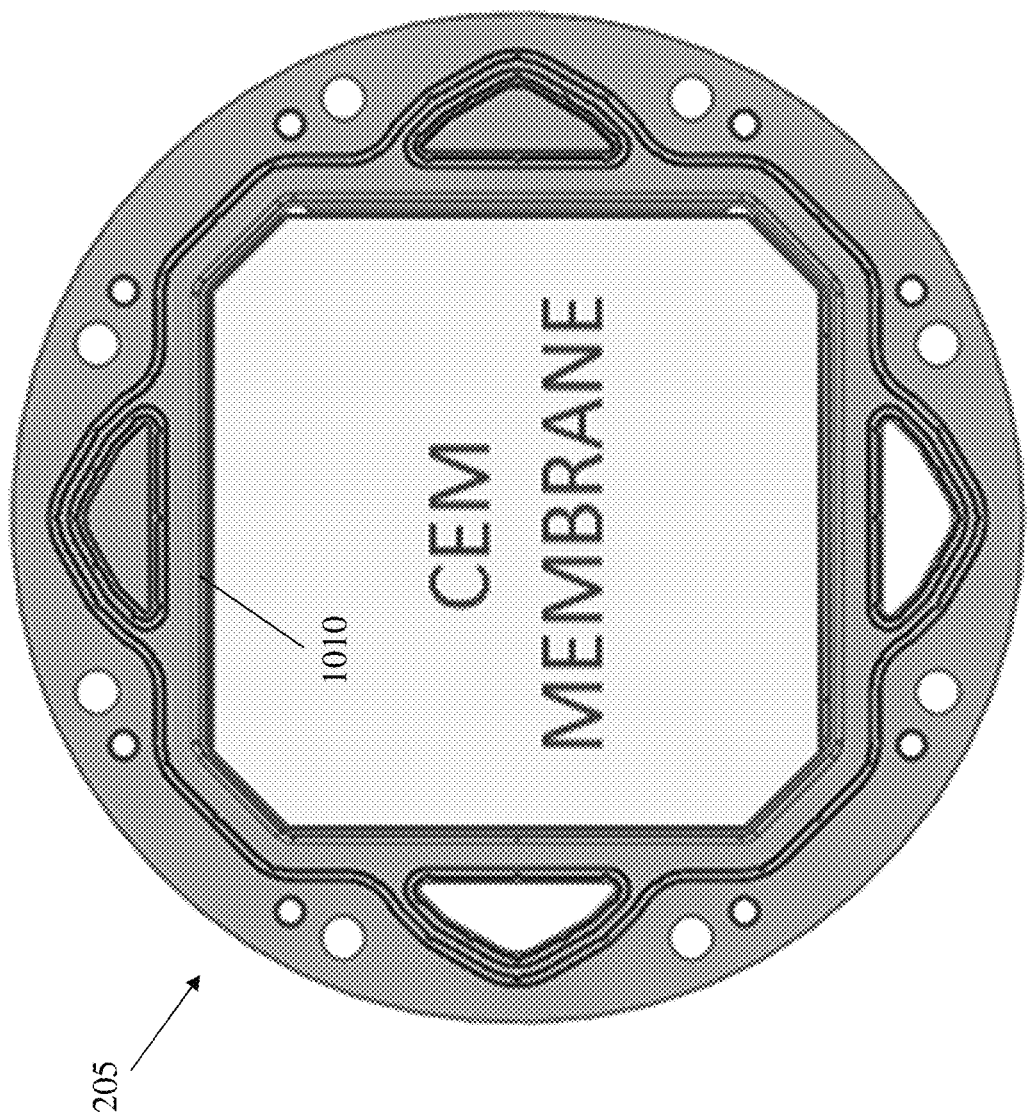
FIG. 10C illustrates the end block of FIG. 10B including an O-ring.
Figure 10D:
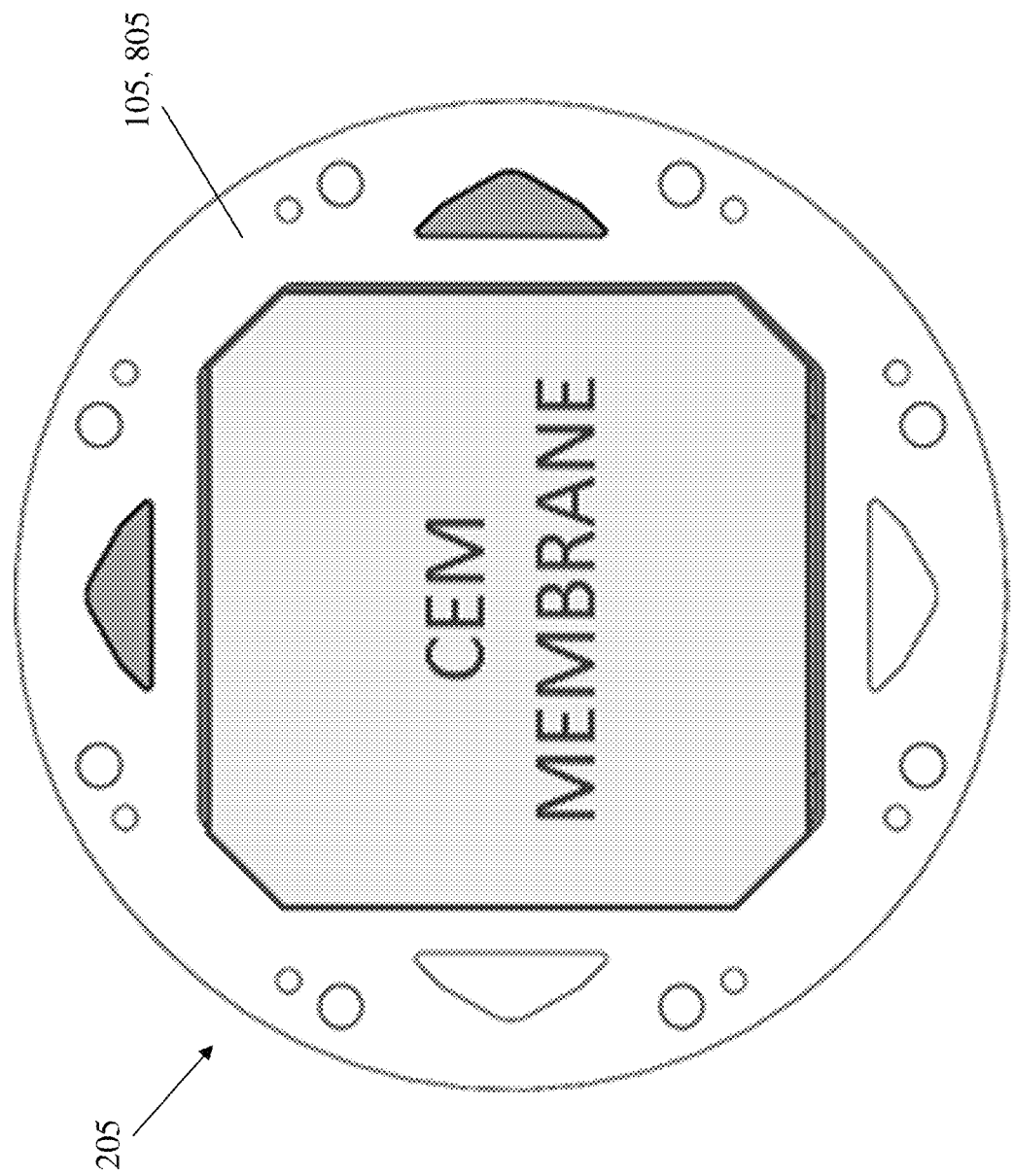
FIG. 10D illustrates the end block of FIG. 10B including a sub-block and spacer assembly.
Figure 11:
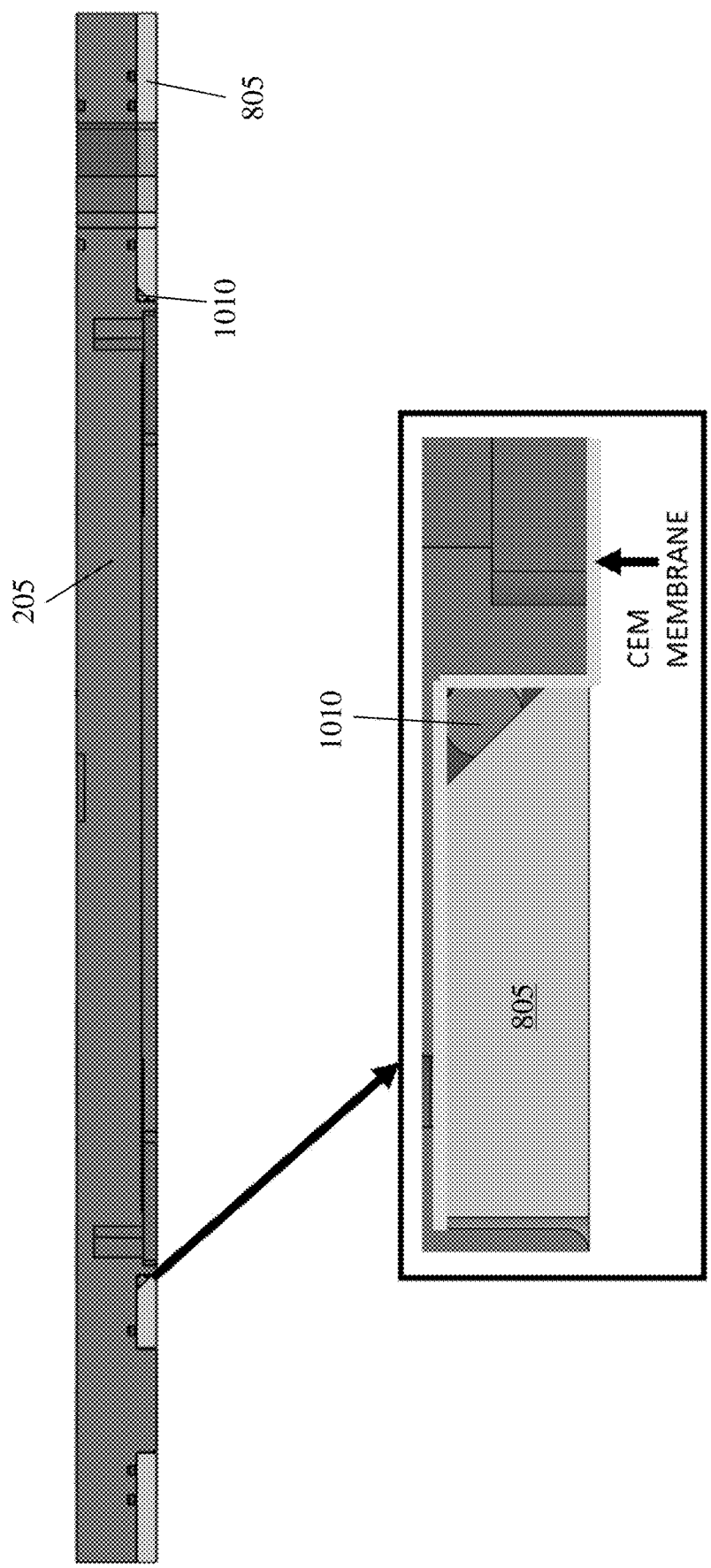
FIG. 11 is a cross-sectional view of the spacer of FIGS. 8A-8C mounted to the end block of FIGS. 10A-10C.

An end-block 205 with an O-ring groove 1005 is assembled with an electrode and screen as illustrated in FIG. 10A. A cation exchange membrane (CEM) is placed atop the electrode assembly as illustrated in FIG. 10B. An O-ring 1010 is circumferentially placed around the electrode assembly, constraining the CEM, as illustrated in FIG. 10C. The sub-block 105 and spacer 805 assembly is then placed atop the end-block 205, as shown in FIG. 10D. A cross-sectional view of the end-block 205 with the spacer 805 and O-ring 1010 disposed therein is illustrated in FIG. 11.

Figure 12A:
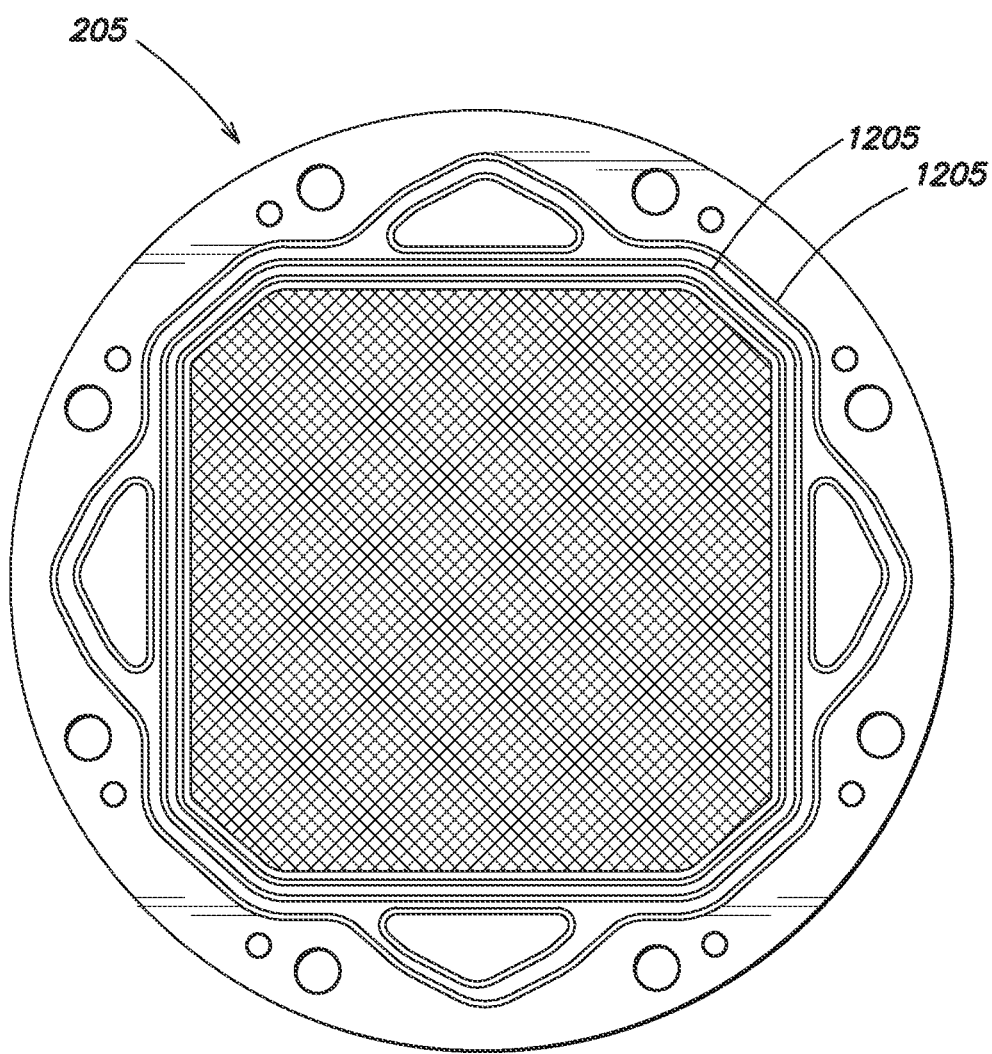
FIG. 12A illustrates an embodiment of an end-block of an ED device including two O-ring grooves defined in a face of the end-block.
Figure 12B:
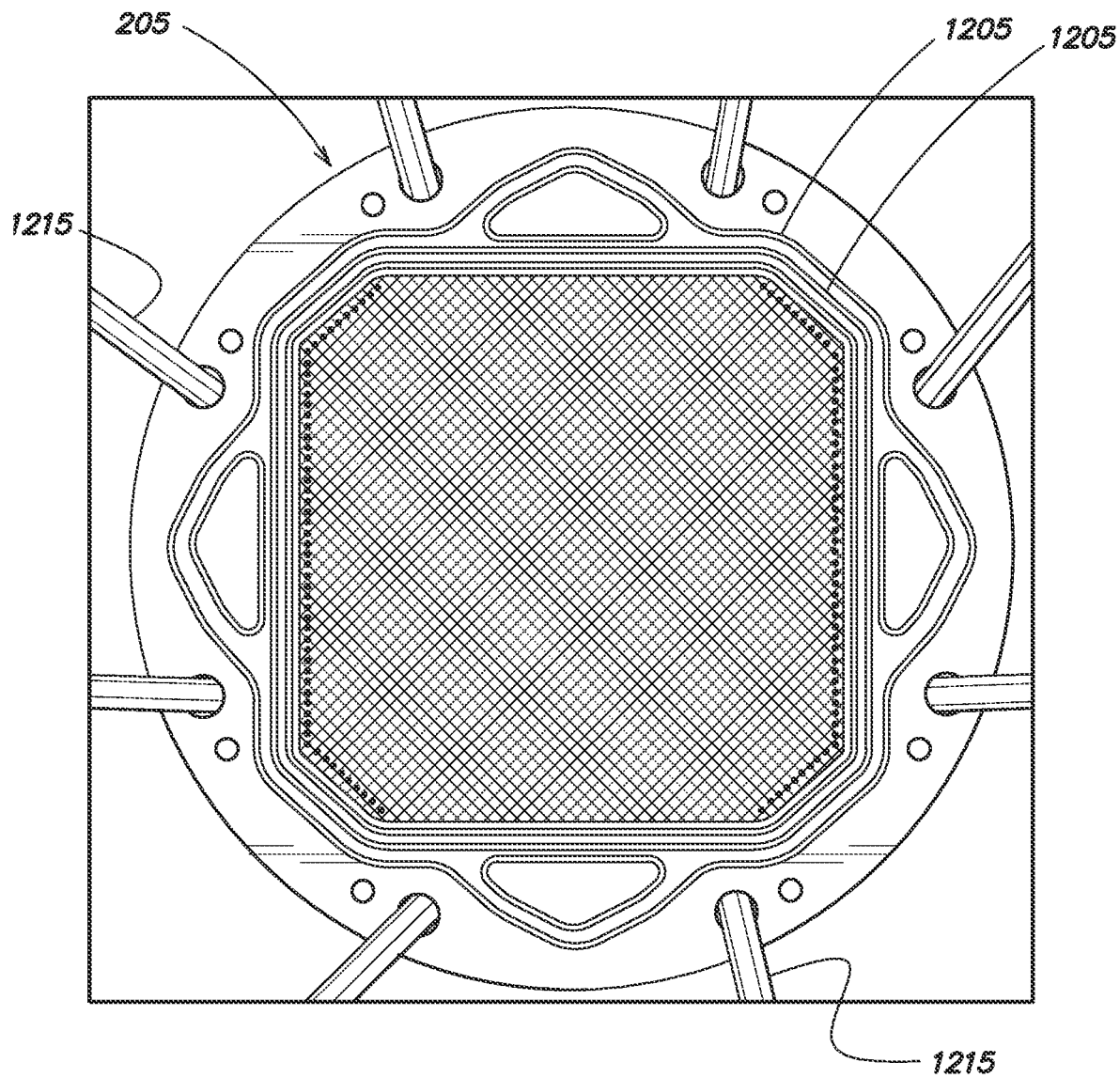
FIG. 12B illustrates the end-block of FIG. 12A with O-rings disposed in the O-ring grooves.

An alternative embodiment of an end-block 205 with face seal O-ring grooves 1205 is illustrated in FIG. 12A. The alternative embodiment of the end-block 205 mounted on assembly tie rods 1215 with O-rings 1210 installed is illustrated in FIG. 12B.

A fully assembled ED device 1300 including a spacer 805 as described above is illustrated in FIG. 13. Tightening of the retaining features, for example, nuts 1305 on the tie bars 1215 on either end of the assembled ED device 1300 provides the compressive force that compresses the seals between adjacent sub-blocks 105 in the cell stack of the ED device 1300.

Figure 14A:
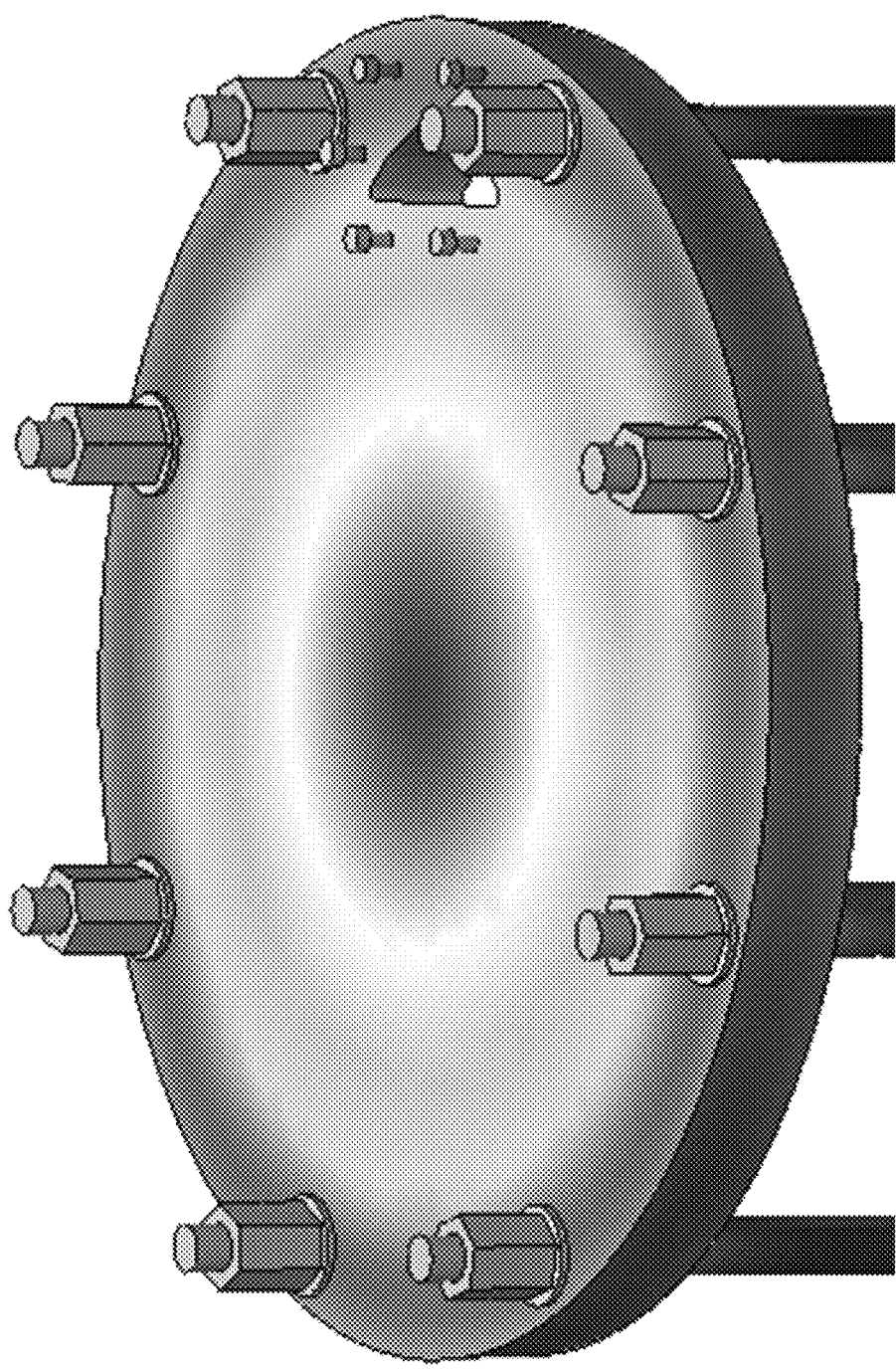
FIG. 14A illustrates results of finite element analysis (FEA) of displacement of an end-block of an ED device due to pressure within the ED device.
Figure 14A:
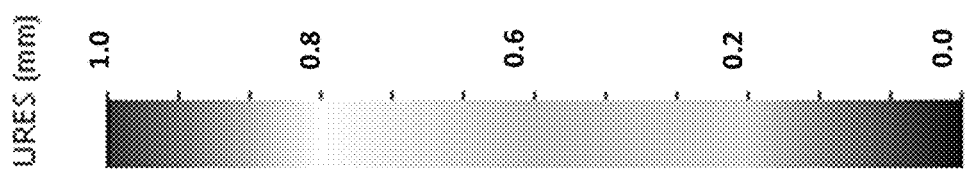
Figure 14B:
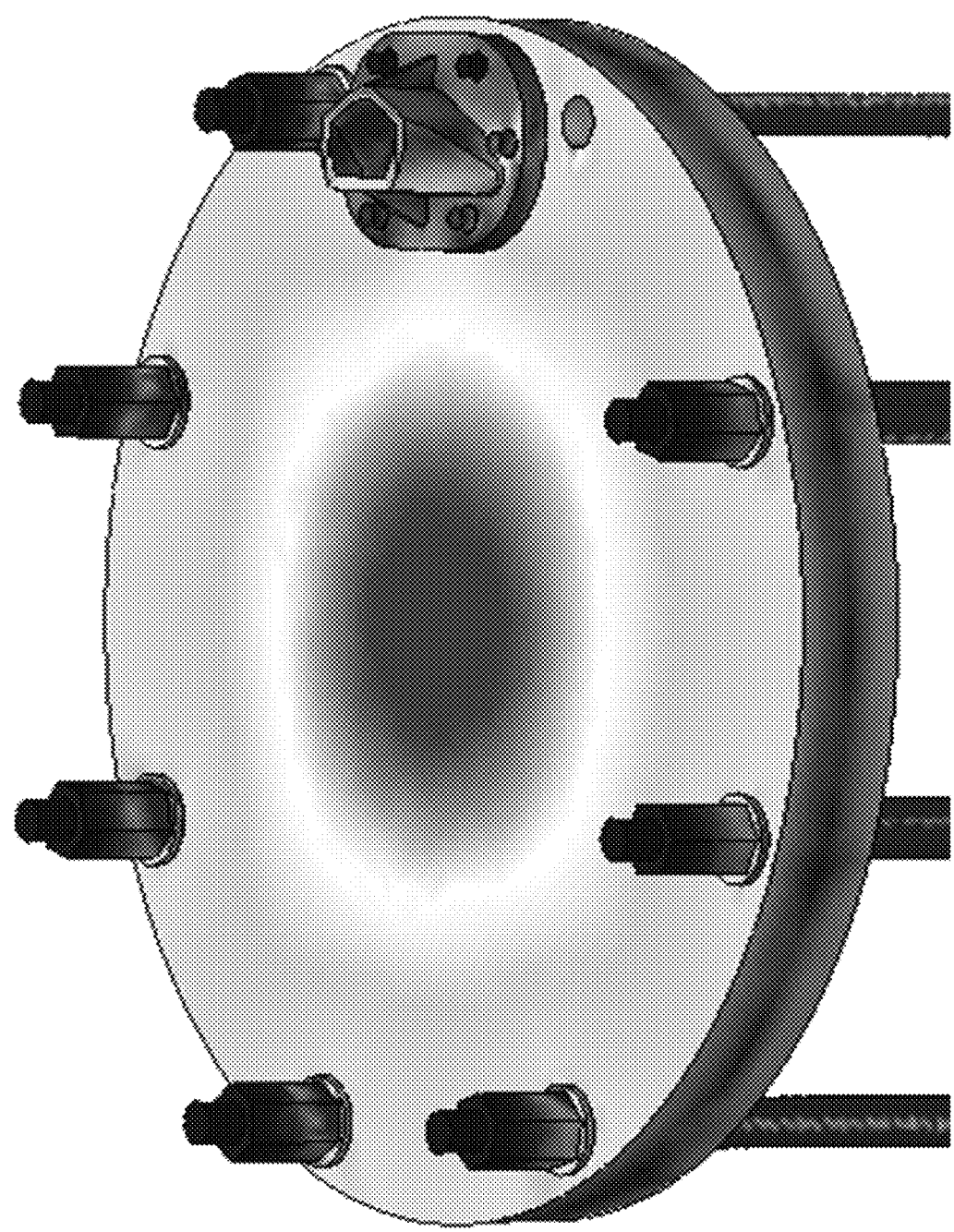
FIG. 14B illustrates results of FEA of stress developed in an end-block of an ED device due to pressure within the ED device.
Figure 14B:
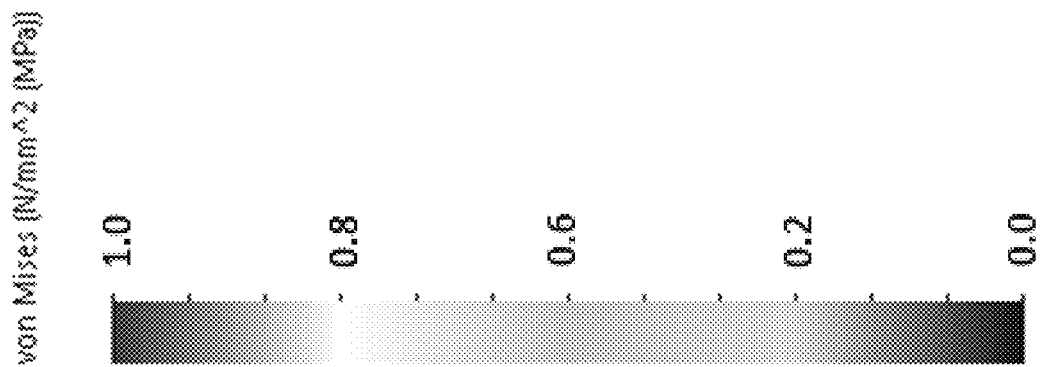
Figure 15A:
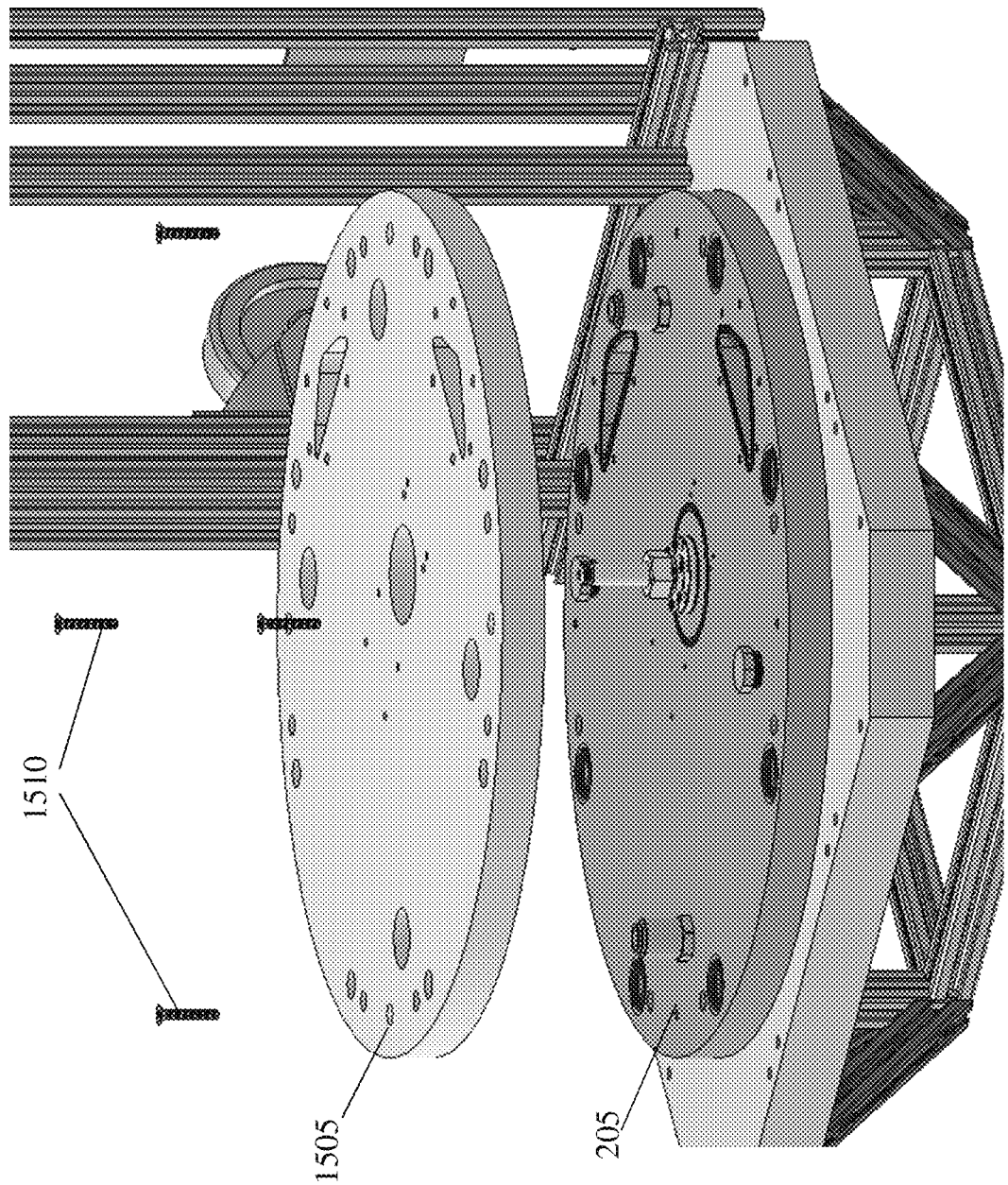
FIG. 15A illustrates a reinforcing plate for an end-block of an ED device.
Figure 15B:
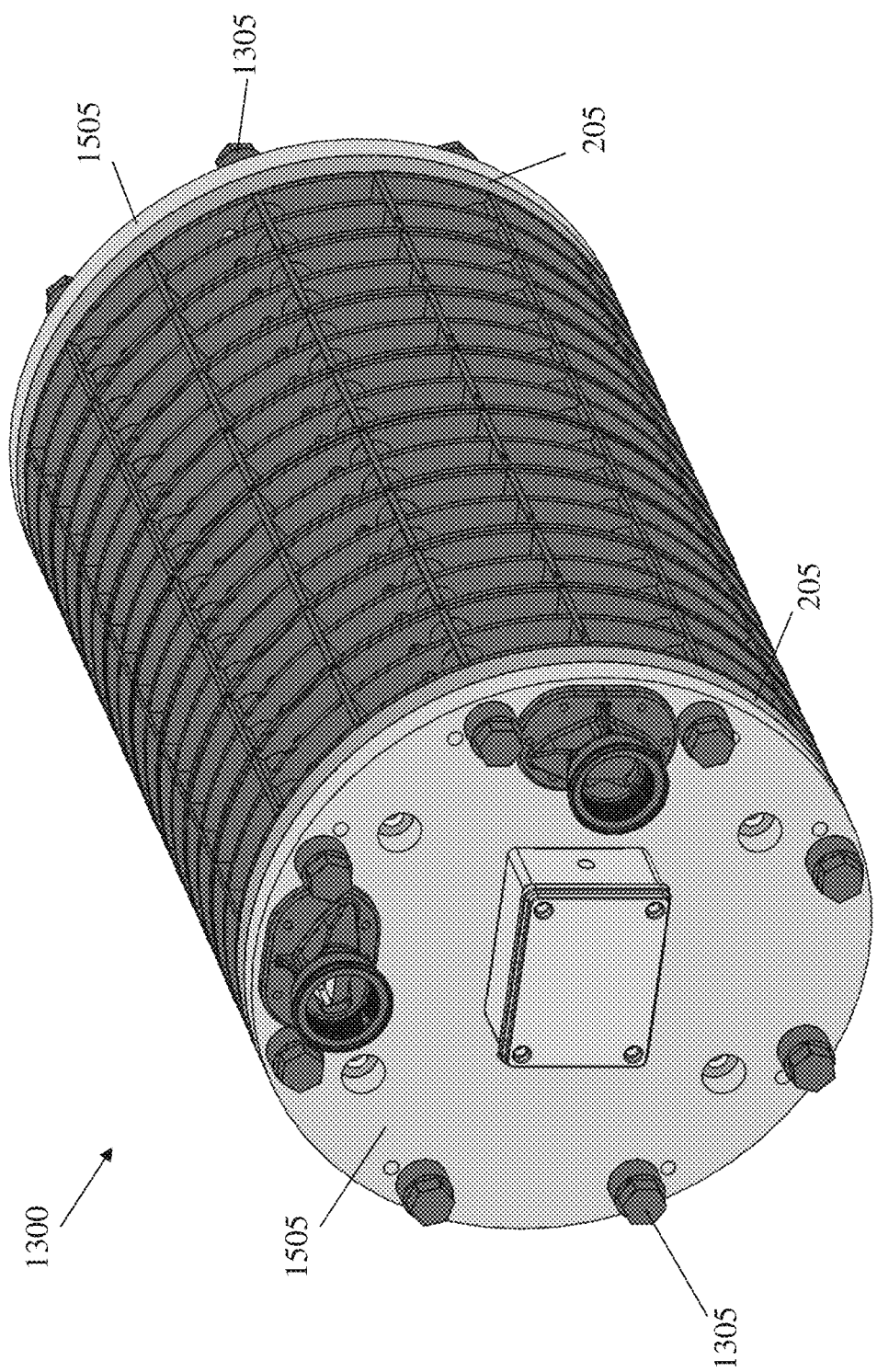
FIG. 15B illustrates reinforcing plates as illustrated in FIG. 15A mounted to end-blocks of an assembled ED device.

In accordance with another aspect, it was discovered that deformation of the end-blocks 205 of an ED device 1300 during operation due to the internal pressure within the device may be a potential cause for leakage. Deformation of the end blocks 205 could compromise the pressure applied to sealing gaskets within the ED device 1300, potentially causing an internal or external leak. Finite element analysis (FEA) was performed on an embodiment of an end-block 205 formed of 1.5 inch (3.8 cm) thick polyvinylchloride (PVC) and the displacement and stress distributions illustrated in FIGS. 14A and 14 B were obtained. To reduce the deformation of the end-blocks 205 of an ED device 1300, the end-blocks may be reinforced, for example, with plates of G10 fiberglass 1505 as illustrated in FIGS. 15A and 15B. The G10 fiberglass has similar yield strength to aluminum but has properties such as low corrosivity and low conductivity that make it a superior choice to aluminum or other metals for reinforcing end-blocks an ED device. The G10 plate may be molded or machined and secured to the end-blocks 205 with captive sealing features 1510, for example, screws or bolts.

Figure 16:
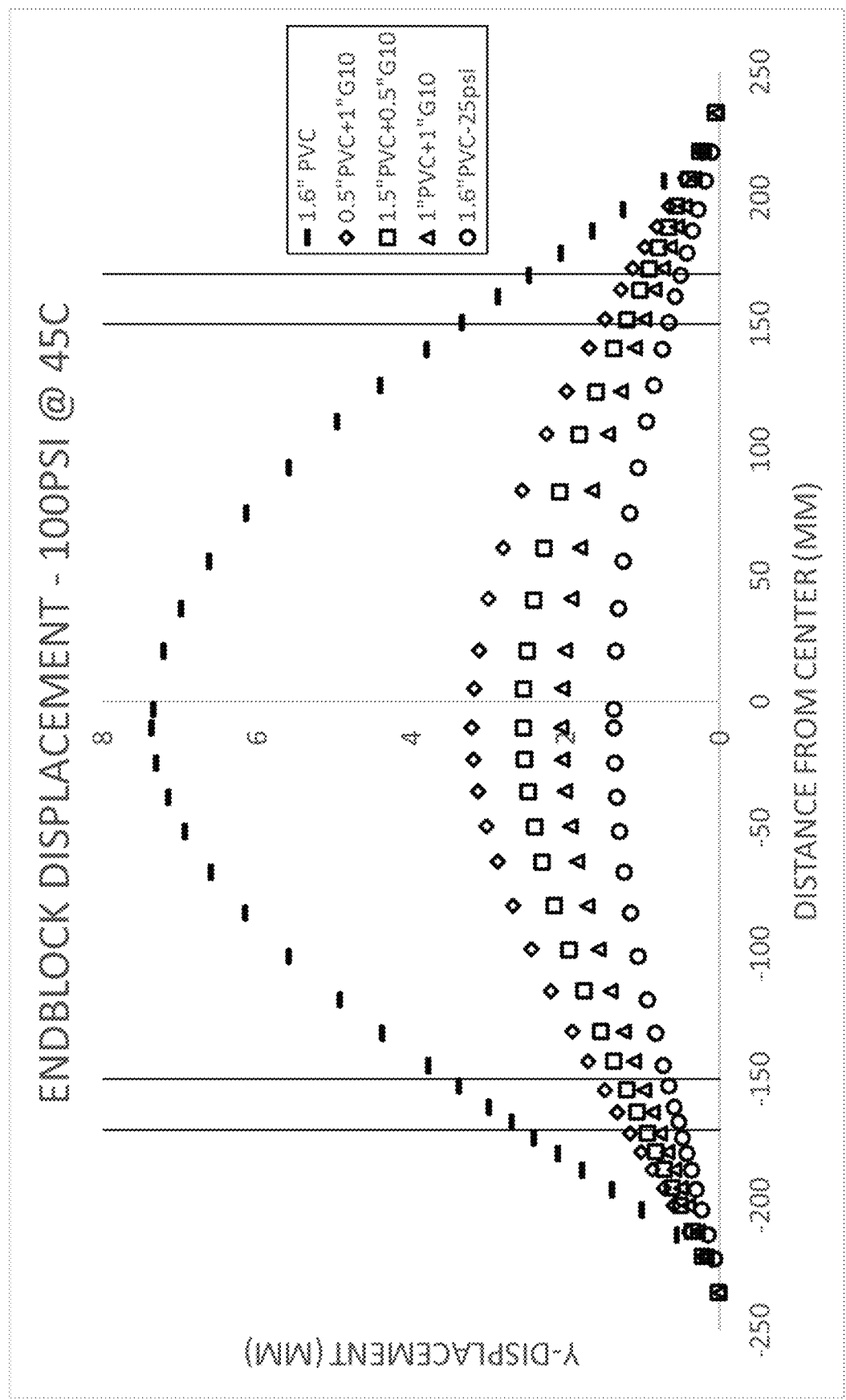
FIG. 16 illustrates results of FEA of displacement of a end-block having different thicknesses and different thicknesses of a reinforcing plate.

FEA was performed for multiple thicknesses and configurations of PVC and G10 reinforcing plates, with an important metric being the resultant displacement at the plate center. The results of this analysis are illustrated in FIG. 16. Based on the analysis 1 inch (2.54 cm) thick PVC with a 1 inch thick G10 reinforcement plate was selected, as this configuration represented the minimum displacement (relative to cost) for sealing features in the range of 150 mm-200 mm distance from the center of the end-block.

It is to be appreciated that various alternative/additional features or methods may be utilized together with or as a replacement to the sealing configurations and methods disclosed above.

Figure 17B:
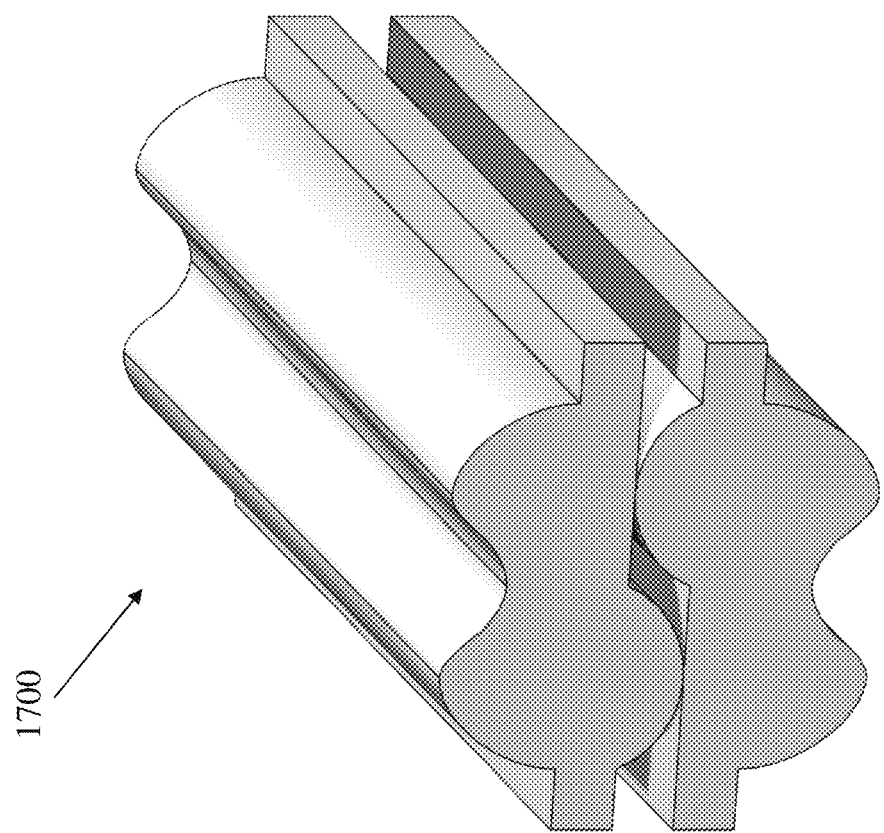
FIG. 17B illustrates a rib profile shape for another embodiment of a molded gasket.
Figure 17A:
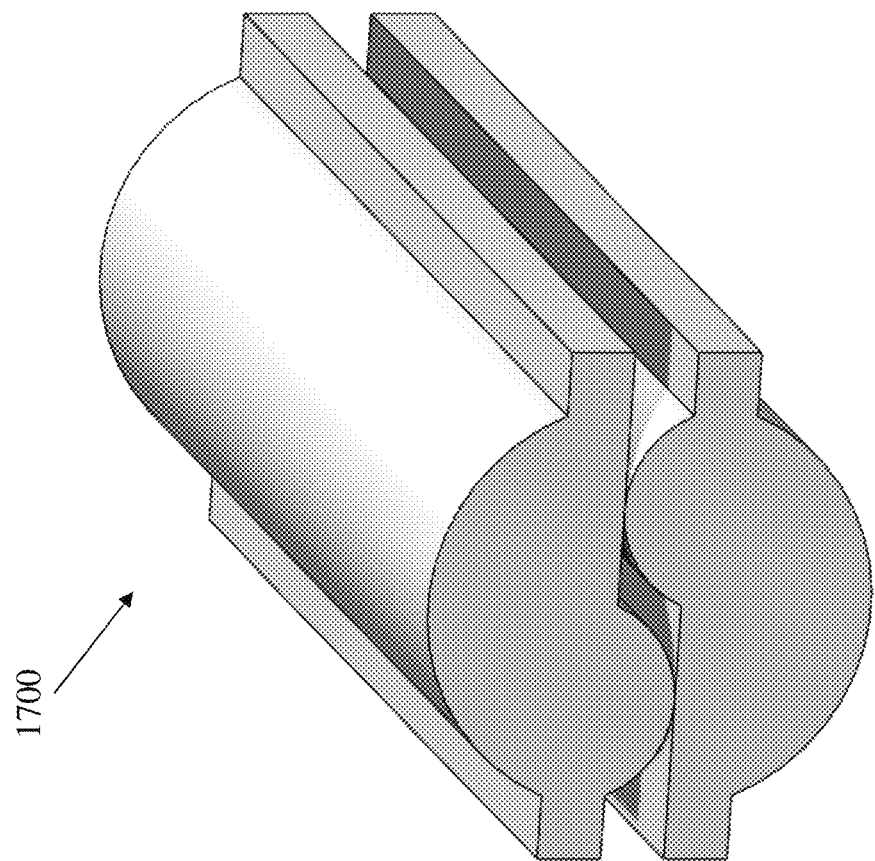
FIG. 17A illustrates a rib profile shape for an embodiment of a molded gasket.
Figure 18:
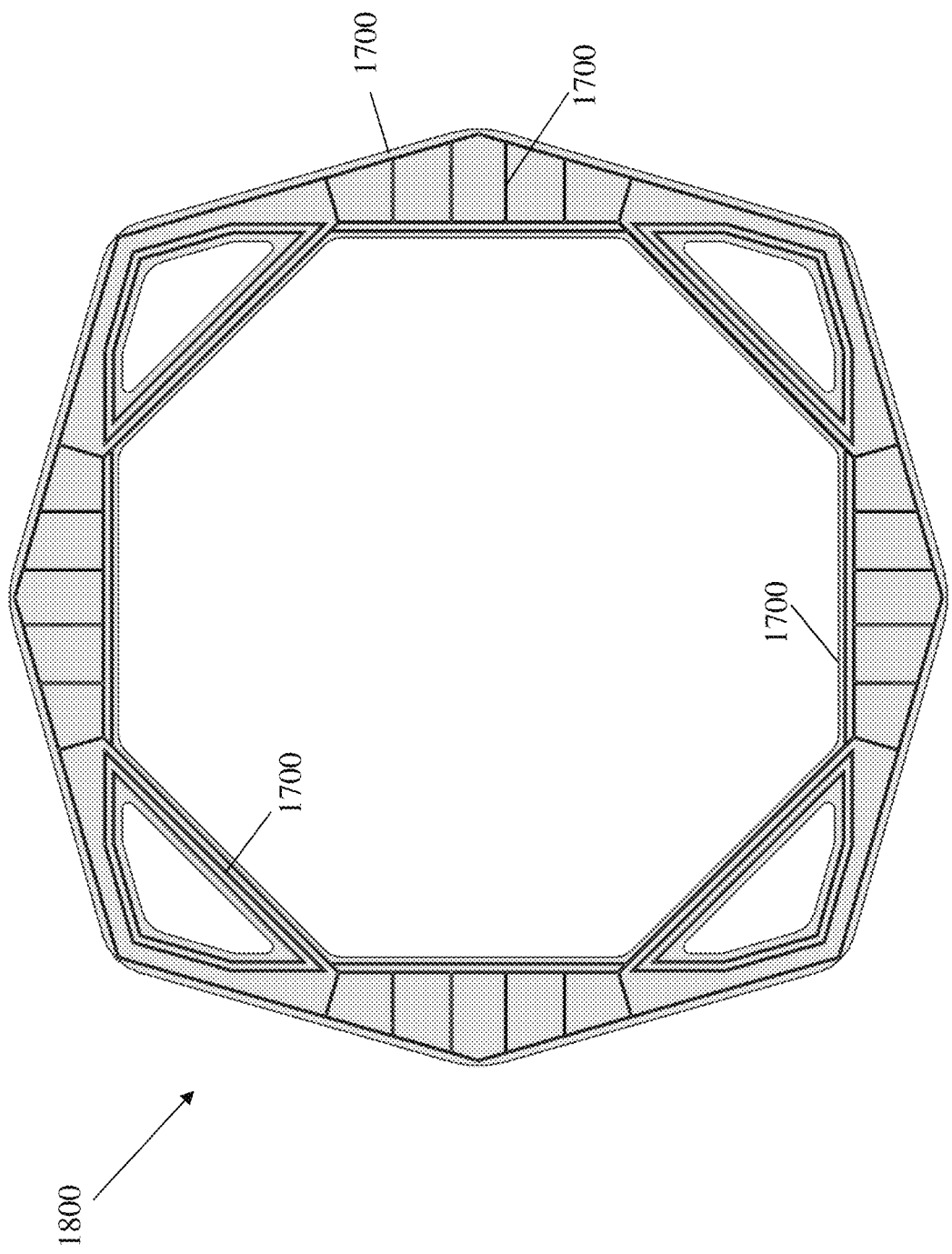
FIG. 18 illustrates a possible layout of ribs on a molded gasket.

Molded Gasket w/Sealing Features:

In one embodiment, molded gaskets may be used instead of die cut gaskets for one or more of the internal low pressure seal sections 505, internal volume displacement sections 510, or external high pressure seal 515 described above using silicone foam or another suitable material. This would allow the creation of sealing features or ribs on the surface of a gasket, where a compressive force can be concentrated to deform the gasket material and effect the sealing. FIGS. 17A and 17B show possible rib profile shapes for molded ribs 1700. FIG. 18 shows a possible layout of where these rib features 1700 may be disposed on a gasket 1800. The ribs 1700 would be disposed around each port as well as around the active area of the sub-block, with additional ribs for compression balance and sealing redundancy. The ribs 1700 may have heights of up to about 2 mm when uncompressed with the non-rib portions of the gasket 1800 being about 200 μm thick. Under compression the ribs 1700 would compress to have a similar thickness as the non-rib portions of the gasket 1800.

Permanent Glue Between Sub-Blocks:

In another embodiment, a glue (for example, epoxy, Room-Temperature-Vulcanizing silicone (RTV), hot melt advesive, etc. . . . ) is used between the sub-block faces of adjacent sub-blocks, which offers several advantages and disadvantages. The glue may provide a robust seal as the glue will be able to conform to any epoxy face deformities. The glue may bond to the frame, making it difficult for water to push through even at higher pressures. The glue would not require compression to seal like a gasket. However, if adjacent sub-blocks are glued together the modular advantage of the sub-blocks may be compromised. In current designs, if a sub-block in a stack is damaged, it can be easily replaced. If glue is used to bond adjacent sub-blocks, replacement of damaged sub-blocks may not be easily performed. The glue material can be placed on the sub-block surfaces in a bead, for example, with a dispensing apparatus on an x-y table.

Defined Corner Displacement:

In another embodiment, the sub-blocks are potted against a flat plate lined with silicone so that when the epoxy cures, the plate is removed and can delaminate due to the silicone. Protrusions may be incorporated into the potting plate so that they form defined indents in the epoxy face of the sub-block. While the surface area is low, these indents may provide features to anchor an overmolded gasket on to. This method may be combined with the permanent glue method.

Membrane Coated with Gasket Material:

In another embodiment, specialized membrane pieces that have gasket material along the outside can be used to serve the same function as a silicone foam gasket. The membrane pieces with integrated gasket material may be single insertable pieces, simplifying manufacture.

Alternative Sub-Block Adhesive, Such as Liquid Silicone or UV Cured Epoxy:

The current adhesive used in the sub-blocks is a special blend of epoxy that exhibits several desirable attributes that provides for successful isolation of the dilute and concentrate streams. The viscosity of the epoxy allows it to penetrate and wick into thin flow channels, the chemical reaction remains below 100° C. so any trapped water does not turn into steam and form air bubbles, and the epoxy hardens to a sufficient degree that is cuts very cleanly when water-jet cut. In another embodiment, a silicone-based replacement for the epoxy or an epoxy that can be UV cured may provide a more uniform surface to seal against on the face of the sub-block.

Proud Potting to be Machined Down:

This would be the opposite approach to the Defined Corner Displacement method. A recess defined in the potting plate may be used so that when potting is finished, the epoxy stands off of the face of the sub-block frame. This epoxy would then be machined down to be the same height as the frame, providing a very flat surface to seal against.

Skin Coat of Epoxy:

In another embodiment, after the first round of epoxy potting is applied to isolate the stack channels from each other, a secondary process can be used to apply a second, very thin layer of new epoxy on top of the cured epoxy, which would be far less prone to shrink, providing a more uniform surface to seal against.

Gasketed Screen:

In another embodiment, spacers made of plastic mesh screen, much like what is used in the sub-blocks, can be used with rubber gasket material applied to the periphery with the mesh embedded within. When these are stacked up, they provide a seal. These would replace the current silicone gaskets, with the CEM in between.

Example 1

Figure 19:
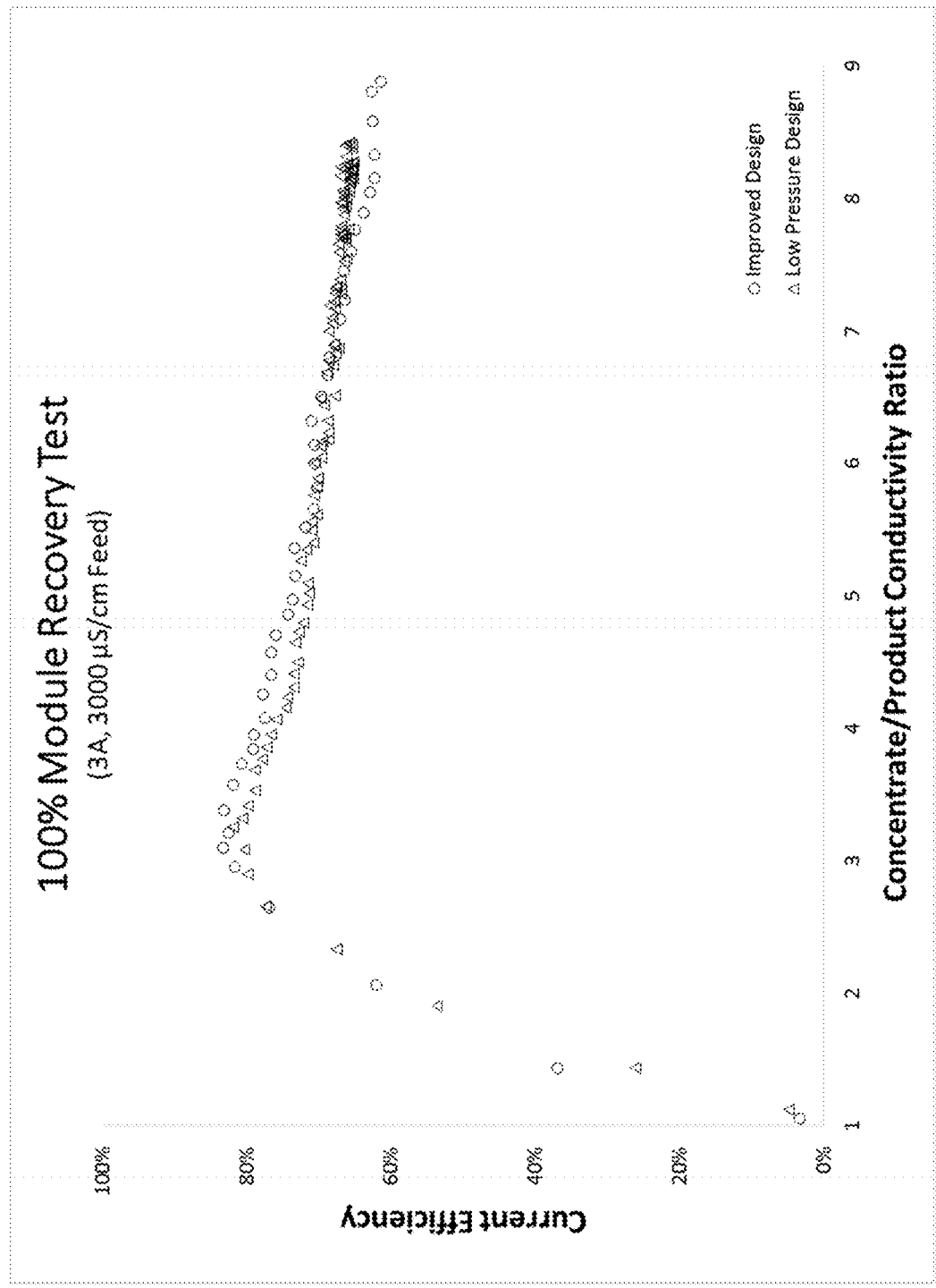
FIG. 19 illustrates results of testing of an ED device including features disclosed herein.

The performance of an embodiment of an ED device including internal low pressure seal sections, internal volume displacement sections, external high pressure seals, reinforced end plates, and spacers and O-rings between electrode sub-modules and adjacent sub-modules as described herein was compared to the performance of an ED device without these enhancements. A comparison between current efficiency at different levels of concentrate (concentrating stream) to product (diluting stream) conductivity was performed. The results are illustrated in the chart of FIG. 19. The ED device with the enhancements disclosed herein (the optimized module in FIG. 19) exhibited similar current efficiency as the unmodified ED device. These results show that inclusion of the features for reducing the potential for leakage of an ED device does not significantly degrade performance of the device.

Example 2

Figure 13:
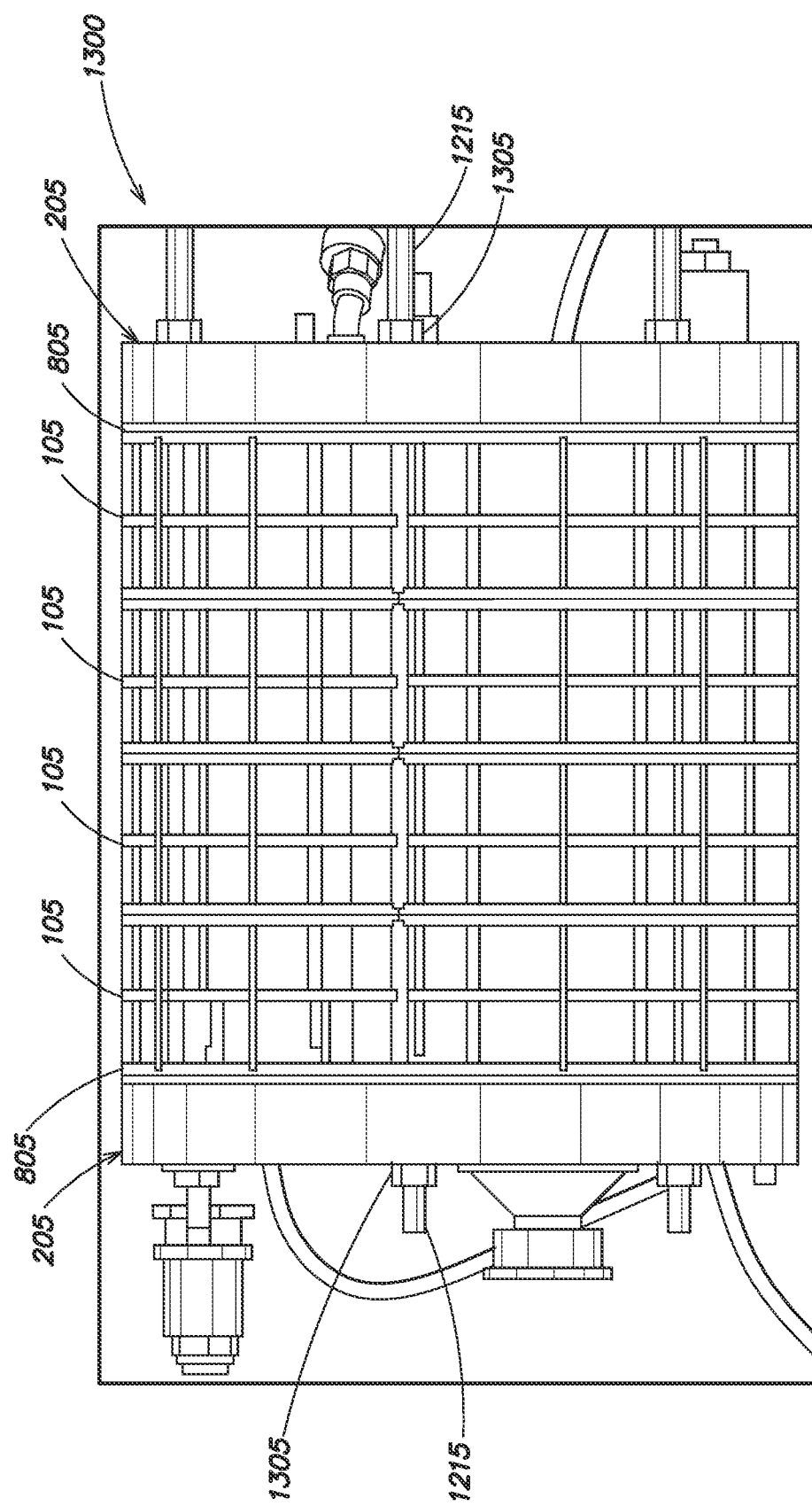
FIG. 13 illustrates an assembled ED device including a sub-block including spacers as illustrated in FIGS. 8A-8C disposed against end-blocks of the ED device.

An ED device as disclosed with regard to FIG. 13 was constructed and pressure tested for leaks. No external leakage was observed after consecutive cycle tests of 50,000 cycles at 20 PSID (138 kPa) and 50,000 cycles at 30 PSID (207 kPa).

Aspects and embodiments disclosed herein are not limited to electrodialysis apparatus. All electrochemical separation devices may benefit from the features and methods disclosed herein. Electrochemical separation devices include but are not limited to Electrodialysis, Electrodialysis Reversal, Continuous Deionization, Continuous Electrodeionization, Electrodeionization, Electrodiaresis, and Capacitive Deionization. Other electrochemical devices that would benefit from the features and methods disclosed herein include Flow Batteries, Fuel Cells, Electrochlorination Cells and Caustic Chlorine Cells.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An electrochemical separation device comprising:
   a first electrode;
   a second electrode;
   a cell stack including a plurality of sub-blocks each having alternating depleting compartments and concentrating compartments disposed between the first electrode and the second electrode, each of the sub-blocks including a frame and channel portions;
   an internal seal formed of a first material disposed between and in contact with the channel portions between adjacent sub-blocks in the cell stack and configured to prevent leakage between depleting compartments and concentrating compartments in the adjacent sub-blocks; and
   an external seal formed of a second material having at least one material parameter different from the first material disposed between and in contact with the frames of the adjacent sub-blocks in the cell stack and configured to prevent leakage from an internal volume of the electrochemical separation device to outside of the electrochemical separation device.

2. The device of claim 1, wherein the external seal is configured to withstand a higher pressure across the external seal without leaking than the internal seal.

3. The device of claim 1, wherein the internal seal is configured to prevent leakage between the depleting compartments and concentrating compartments under conditions in which the channel portions exhibit sinks of less than about 1 mm in depth.

4. The device of claim 3, wherein the external seal is configured to prevent leakage from the internal volume of the electrochemical separation device under conditions in which the frames exhibit pits of less than about 250 µm in depth.

5. The device of claim 4, wherein the internal seal includes closed-cell silicone foam.

6. The device of claim 5, wherein the internal seal includes a plurality of separate sections of the closed-cell silicone foam.

7. The device of claim 6, further comprising internal volume displacement sections disposed between adjacent sections of the internal seal.

8. The device of claim 7, wherein the internal volume displacement sections are formed of a same material or a softer material than the sections of the internal seal.

9. The device of claim 5, wherein the external seal is formed of a sheet of silicone rubber.

10. The device of claim 9, wherein apertures are defined in the external seal over closed portions of the frames.

11. The device of claim 1, further comprising:
    an end-block housing an electrode;
    a sub-block adjacent the end-block including a spacer bonded to a face thereof over the frame and channel portions;
    an O-ring groove defined between the spacer and the end-block; and
    an O-ring disposed within the O-ring groove.

12. The device of claim 1, further comprising an end-block housing an electrode, having a plurality of O-ring grooves defined between the end-block and a sub-block adjacent the end-block, and an O-ring disposed in each O-ring groove.

13. A method of applying a seal to an end-block of an electrochemical separation device, the method comprising:
    disposing sections of an internal seal in a jig having cutouts configured to retain the sections of the internal seal, the sections of the internal seal formed of a first material;
    placing a sub-block of the electrochemical separation device including a channel portion and a frame on the jig;
    adhering the sections of the internal seal to the channel portion on a side of the sub-block;
    removing the sub-block from the jig; and
    applying an external seal to the frame on the side of the sub-block, the external seal formed of a second material including at least one material parameter different from the first material.

14. The method of claim 13, further comprising forming the sections of the internal seal from the first material.

15. The method of claim 14, further comprising forming the external seal from the second material, the second material being harder than the first material.

16. The method of claim 15, further comprising forming apertures in the external seal in locations in the external seal that are to be disposed over bare areas of the frame.

17. The method of claim 15, wherein forming the sections of the internal seal from the first material comprises forming the sections of the internal seal from silicone foam.

18. The method of claim 17, wherein forming the external seal from the second material comprises forming the external seal from a sheet of silicone rubber.

19. The method of claim 13, further comprising disposing sections of volume displacement material within the jig between adjacent sections of the internal seal.

20. The method of claim 19, further comprising adhering the sections of volume displacement material to the channel portion on the side of the sub-block.

* * * * *